United States Patent
LaComb et al.

(10) Patent No.: US 7,627,454 B2
(45) Date of Patent: Dec. 1, 2009

(54) METHOD AND SYSTEM FOR PREDICTING TURBOMACHINERY FAILURE EVENTS EMPLOYING GENETIC ALGORITHM

(75) Inventors: Christina A. LaComb, Schenectady, NY (US); John A. Interrante, Scotia, NY (US); Thomas R. Kiehl, Wynantskill, NY (US); Deniz Senturk-Doganaksoy, Danbury, CT (US); Bethany K. Hoogs, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 164 days.

(21) Appl. No.: 11/872,732

(22) Filed: Oct. 16, 2007

(65) Prior Publication Data

US 2009/0100293 A1    Apr. 16, 2009

(51) Int. Cl.
G06F 11/07    (2006.01)
G06F 11/30    (2006.01)

(52) U.S. Cl. .................. 702/182; 702/185; 707/100

(58) Field of Classification Search ......... 702/182–185; 705/7, 35; 714/25; 707/100
See application file for complete search history.

(56) References Cited

U.S. PATENT DOCUMENTS

| | | |
|---|---|---|
| 7,017,079 B2 | 3/2006 | Gulati et al. |
| 7,236,911 B1 | 6/2007 | Gough et al. |
| 2006/0015377 A1 | 1/2006 | Hoogs et al. |
| 2006/0031150 A1 | 2/2006 | Senturk et al. |
| 2006/0059063 A1 | 3/2006 | LaComb et al. |
| 2008/0177756 A1* | 7/2008 | Kosche et al. ............... 707/100 |

* cited by examiner

*Primary Examiner*—John H Le
(74) *Attorney, Agent, or Firm*—James W. Pemrick; Ernest G. Cusick; Frank A. Landgraff

(57) ABSTRACT

A method for predicting or detecting an event in turbomachinery includes the steps of obtaining operational data from at least one machine and at least one peer machine. The operational data comprises a plurality of performance metrics. A genetic algorithm (GA) analyzes the operational data, and generates a plurality of clauses, which are used to characterize the operational data. The clauses are evaluated as being either "true" or "false". A fitness function identifies a fitness value for each of the clauses. A perturbation is applied to selected clauses to create additional clauses, which are then added to the clauses group. The steps of applying a fitness function, selecting a plurality of clauses, and applying a perturbation can be repeated until a predetermined fitness value is reached. The selected clauses are then applied to the operational data from the machine to detect or predict a past, present or future event.

16 Claims, 14 Drawing Sheets

| Sample Size | 1 | 1.5 | 1.75 | 2 | 3 | 4 | 5 | 6 | 7 | 8 | 9 | 10 | 20 | 30 | 40 | 50 |
|---|---|---|---|---|---|---|---|---|---|---|---|---|---|---|---|---|
| 3 | 52.68 % | 37.95 % | 32.48 % | 28.38 % | 18.24 % | 13.26 % | 10.54 % | 8.77 % | 7.50 % | 6.60 % | 5.87 % | 5.38 % | 2.67 % | 1.79 % | 1.36 % | 1.11 % |
| 4 | 48.13 % | 32.39 % | 26.80 % | 22.40 % | 12.02 % | 7.20 % | 4.69 % | 3.27 % | 2.46 % | 1.86 % | 1.49 % | 1.25 % | 0.30 % | 0.14 % | 0.09 % | 0.06 % |
| 5 | 43.61 % | 27.06 % | 21.51 % | 17.12 % | 7.56 % | 3.79 % | 2.10 % | 1.25 % | 0.81 % | 0.54 % | 0.40 % | 0.27 % | 0.03 % | 0.00 % | 0.00 % | 0.00 % |
| 6 | 41.30 % | 24.35 % | 18.61 % | 14.31 % | 5.22 % | 2.08 % | 1.01 % | 0.50 % | 0.25 % | 0.12 % | 0.09 % | 0.06 % | 0.00 % | 0.00 % | 0.00 % | 0.00 % |
| 7 | 39.64 % | 22.44 % | 16.68 % | 12.31 % | 3.79 % | 1.32 % | 0.59 % | 0.28 % | 0.15 % | 0.08 % | 0.04 % | 0.03 % | 0.00 % | 0.00 % | 0.00 % | 0.00 % |
| 8 | 38.55 % | 21.09 % | 15.30 % | 10.96 % | 3.03 % | 0.97 % | 0.37 % | 0.15 % | 0.06 % | 0.04 % | 0.02 % | 0.01 % | 0.00 % | 0.00 % | 0.00 % | 0.00 % |
| 9 | 37.43 % | 19.50 % | 13.78 % | 9.63 % | 2.40 % | 0.66 % | 0.20 % | 0.07 % | 0.03 % | 0.02 % | 0.01 % | 0.01 % | 0.00 % | 0.00 % | 0.00 % | 0.00 % |
| 10 | 37.00 % | 19.17 % | 13.56 % | 9.52 % | 2.18 % | 0.53 % | 0.12 % | 0.05 % | 0.02 % | 0.00 % | 0.00 % | 0.00 % | 0.00 % | 0.00 % | 0.00 % | 0.00 % |
| 20 | 34.36 % | 16.10 % | 10.54 % | 6.68 % | 0.90 % | 0.11 % | 0.01 % | 0.00 % | 0.00 % | 0.00 % | 0.00 % | 0.00 % | 0.00 % | 0.00 % | 0.00 % | 0.00 % |

FIG. 1

| Comparison Conditionals | | | | | | | | | |
|---|---|---|---|---|---|---|---|---|---|
| | DWATT | 300 | 321 | 323 | 322 | 332 | 311 | 132 |
| | CTIM | 82 | 82 | 91 | 87 | 88 | 91 | 90 |
| | Date | 01/01/07 | 01/01/07 | 01/01/07 | 01/01/07 | 01/01/07 | 01/01/07 | 01/01/08 |
| | OPMODE | 18 | 19 | 20 | 21 | 22 | 23 | 0 |
| Tags | | | | | | | | | |
| | AFPAP | | | | | | | | |
| | GRS_PWR_COR | | | | | | | | |
| | CSGV | | | | | | | | |
| Alerts | | | | | | | | | |
| | Low Alert | | | | | | | | |
| | High Alert | | | | | | | | |

2, 3, A, >, 10, 1, 4, B, <, -5, 5, 5, C, >1
2 out of 3 time periods of metric (A) are greater than 10 and
1 out of 4 time periods of metric (B) is less than -5 and
5 out of 5 time periods of metric (C) are greater than 1

| $t_{n-4}$ | $t_{n-3}$ | $t_{n-2}$ | $t_{n-1}$ | $t_n$ | |
|---|---|---|---|---|---|
| | | 12 | 5 | 15 | Metric A |
| | | -7 | | | Metric B |
| 2 | 5 | 10 | 3 | 9 | Metric C |

```
Unit:    , 1, 2, 3, 4, 5, 6, 7, 8, 9,10,11,12,13,14,15,16,17,18,19,20,21,22,23,24,25,26,27 |TP:FP  Pattern
Flag 0:  , x,  ,  ,  , x,  ,  ,  , x,  ,  ,  ,  ,  ,  ,  ,  ,  ,  ,  ,  ,  ,  ,  ,  ,  ,    |  3:0  (-1 0 * 0 -1)
flag 1:  ,  , 0, 0,  ,  ,  , 0, 0,  , 0, 0, 0,  ,  ,  ,  ,  ,  ,  ,  ,  ,  ,  ,  ,  , 0,    |  7:1  (0 0 0 0 *)
flag 2:  ,  , 0,  ,  , 0, 0, 0,  , 0, 0, 0,  ,  ,  ,  ,  ,  ,  ,  ,  ,  ,  ,  ,  ,  , 0,    |  7:1  (* * 0 0 *)
flag 3:  ,  , 0,  ,  , 0,  ,  , 0,  ,  , 0,  ,  ,  ,  ,  , 0,  ,  , 0,  ,  ,  ,  ,  , 0,    |  4:3  (0 0 0 * 0)
flag 4:  ,  ,  ,  ,  , x, x,  ,  ,  ,  ,  ,  ,  ,  ,  ,  ,  ,  ,  ,  ,  ,  ,  ,  ,  ,  ,    |  2:0  (-1 1 * 0 0)
flag 5:  ,  , 0,  ,  ,  ,  , 0,  ,  , 0, 0,  ,  ,  ,  ,  ,  ,  ,  ,  ,  ,  ,  ,  ,  , 0,    |  4:1  (0 0 0 0 *)
flag 6:  ,  , 0, 0, 0, 0, 0,  , 0,  ,  , 0, 0,  ,  ,  ,  ,  , 0,  ,  , 0,  ,  ,  ,  ,  ,    |  8:2  (0 0 0 * *)
flag 7:  ,  , 0, 0,  , 0, 0,  , 0,  , 0, 0, 0,  ,  ,  ,  ,  ,  ,  , 0,  ,  ,  ,  ,  , 0,    |  8:2  (* * * 0 *)
flag 8:  , x,  ,  , x, x, x,  , x,  , x,  ,  , x,  ,  ,  ,  ,  ,  ,  ,  ,  ,  ,  ,  ,  ,    |  6:1  (1 * -1 * *)
flag 9:  ,  ,  ,  ,  ,  ,  ,  ,  ,  ,  , x,  ,  ,  ,  ,  ,  ,  ,  ,  ,  ,  ,  ,  ,  ,  ,    |  1:0  (* 0 * * 1)
flag 10: ,  , 0, 0,  , 0, 0,  , 0,  ,  , 0, 0, 0,  ,  ,  ,  ,  ,  ,  ,  ,  ,  ,  ,  , 0,    |  8:1  (-1 * * 0 0)
flag 11: 0,  , 0,  ,  , 0,  , 0, 0,  ,  , 0,  ,  ,  ,  ,  ,  ,  ,  , 0,  ,  ,  ,  ,  ,  ,    |  6:1  (0 0 * * -1)
flag 12: ,  , 0, 0, 0,  ,  ,  , 0,  , 0, 0,  ,  ,  ,  ,  , 0,  ,  , 0,  ,  ,  ,  ,  ,  ,    |  6:2  (0 0 * 0 0)
flag 13: ,  , x, x,  ,  , x,  ,  ,  , x,  ,  ,  ,  ,  ,  ,  ,  ,  ,  ,  ,  ,  ,  ,  ,  ,    |  4:0  (-1 * 1 * *)
flag 14: 0, 0, 0, 0, 0, 0, 0, 0, 0, 0, 0, 0, 0, 0,  , 0,  , 0, 0, 0, 0, 0, 0, 0, 0, 0, 0, 0 | 14:12 (0 0 1 1 1)
flag 15: x, x,  ,  , x,  ,  ,  ,  ,  , x,  , x,  ,  ,  ,  ,  , x,  ,  ,  ,  ,  ,  ,  ,  ,    |  5:1  (0 0 1 0 *)
flag 16: ,  ,  , x,  , x,  , x,  ,  ,  ,  ,  ,  ,  ,  ,  ,  ,  ,  ,  ,  ,  ,  ,  ,  ,  , x  |  3:1  (0 1 1 * 1)
totals:  3, 4,11, 6, 4, 8, 8, 8,10, 2, 4,11,10, 5, 0, 2, 0, 1, 1, 5, 2, 1, 5, 1, 1, 1, 7, 2 |
```

FIG. 16

|          | Overall |      | Training Set |      | Hold-out Set |      |
|----------|---------|------|--------------|------|--------------|------|
|          | Failure | Peer | Failure      | Peer | Failure      | Peer |
| Pattern 1 | 39%    | 97%  | 44%          | 97%  | 27%          | 98%  |
| Pattern 2 | 37%    | 97%  | 42%          | 97%  | 27%          | 96%  |
| Pattern 3 | 27%    | 99%  | 32%          | 98%  | 13%          | 100% |
| Combined  | 63%    | 5%   |              |      |              |      |

FIG. 17

METHOD AND SYSTEM FOR PREDICTING TURBOMACHINERY FAILURE EVENTS EMPLOYING GENETIC ALGORITHM

BACKGROUND OF THE INVENTION

The present invention is related to the following applications: Ser. No. 11/881,608, titled "Fleet Anomaly Detection Method", filed on Jul. 27, 2007, and application Ser. No. 11/881,612, titled "Anomaly Aggregation Method", filed on Jul. 27, 2007.

The system described herein relates generally to finding patterns in temporal data. More specifically, the system relates to the prediction of turbomachinery failure events by using statistical techniques and a genetic algorithm, to aggregate, identify and pattern outlying (i.e., anomalous) engineering or operational data when compared to small sets of related engineering or operational data.

In the operation and maintenance of power generation equipment (e.g., turbines, compressors, generators, etc.), sensor readings corresponding to various attributes of the machine are received and stored. These sensor readings are often called "tags", and there are many types of tags (e.g., vibration tags, efficiency tags, temperature tags, pressure tags, etc.).

Close monitoring of these tags across time has many benefits in understanding machine deterioration characteristics (e.g., internal damage to units, compressor events, planned vs. unplanned trips). For example, increasing values (over time) of rotor vibration in a compressor, may be an indication of a serious problem. Better knowledge of deterioration in machines also improves fault diagnostic capability via a set of built-in rules or alerts that act as leading indicators for machine events. Simultaneous display of all tag anomalies together with the designed rules-alerts makes machine monitoring and diagnostics, as well as, new rule/alert creation, extremely efficient and effective. Individuals responsible for monitoring and diagnostics can have their immediate attention directed to critical deviations.

However, there is a considerable amount of noise in sensor data. To remove noise and make observations comparable across time or across machines, many different corrections need to be made and many different controlling factors need to be used. Even then, it is still very hard to simultaneously monitor many tags (there can be several hundred to thousands of tags) and diagnose the anomalies in the data.

Removing the noise from data and catching or identifying anomalies in a usable format (e.g., magnitude and direction) and then using that anomaly information in rule or model building is a needed process in many different businesses, technologies and fields. In engineering applications, monitoring and diagnostic teams typically address the problem in routine and ad-hoc fashion via control charts, histograms, and scatter plots. However, this approach necessitates a subjective assessment as to whether a given tag is anomalously high or low.

There are known statistical techniques including z-scores to evaluate the degree to which a particular value in a group is an outlier, that is, anomalous. Typical z-scores are based upon a calculation of the mean and the standard deviation of a group. While a z-score can be effective in evaluating the degree to which a single observation is anomalous in a well populated group, z-scores have been shown to lose their effectiveness as an indication of anomalousness when used on sets of data that contain only a small number of values.

When calculating anomaly scores, it is often the case that there are only a few values with which to work. For instance, when comparing a machine (e.g., a turbine) to a set of peer machines (e.g., similar turbines), it is often the case that it is difficult to identify more than a handful of machines that can legitimately be considered peers of the target machine. In addition, it is often desirable to evaluate the performance of machines that may only have been in operation under the current configuration for a limited period of time. As a result, it is often not desirable or accurate to use standard z-scores as a measurement for anomaly scores since standard z-scores are not robust with small datasets.

Accordingly, a need exists in the art for a system that can predict failure events, before they occur, in machines by analyzing past and/or current operational data.

BRIEF DESCRIPTION OF THE INVENTION

According to one aspect of the present invention a method for predicting or detecting an event in turbomachinery is provided. The method includes the step of obtaining operational data from at least one machine. The operational data comprises a plurality of performance metrics associated with the machine's operation and a plurality of time periods. Another step obtains peer operational data from at least one peer machine. The peer operational data comprises a plurality of performance metrics associated with the operation of the peer machines. A determining step determines if the peer machines have experienced the event or not experienced the event. A genetic algorithm (GA) is employed to analyze the operational data and the peer operational data. The genetic algorithm generates a plurality of clauses, and the clauses are used to characterize the operational data. Each clause is comprised of a plurality of alleles, and the alleles are comprised of a count of time periods, at least one performance metric, a comparison operator, a threshold value, and a positive fraction. The next step evaluates the clauses as being either "true" or "false". A "true" evaluation is obtained if for any given number of time periods equal to the count of time periods, at least a fraction of the time periods equal to the positive fraction contain a performance metric which satisfies a comparison operator with respect to the threshold value. A "false" evaluation is obtained otherwise. In the next step a fitness function is applied to identify a fitness value for each of the clauses. The fitness value is determined by the degree to which each of the clauses evaluates as "true" when applied to at least one peer machine for which it is known the event has occurred, and "false" when applied to at least one peer machine for which it is known said event has not occurred. The next step selects a plurality of clauses having a greater fitness value than other clauses, and those clauses having a greater fitness value form a selected clauses group. A perturbation is applied to the alleles of the selected clauses to create additional clauses and these additional clauses are added to the selected clauses group. The steps of applying a fitness function, selecting a plurality of clauses, and applying a perturbation can be repeated until a predetermined fitness value is reached for the selected clauses. The selected clauses are then applied to the operational data from the machine to determine whether the operational data indicates a past, present or future event.

According to another aspect of the present invention a method of predicting or detecting the occurrence of an event for an entity using a genetic algorithm is provided. A first step includes obtaining operational data for the entity, and the operational data comprises measurements of a plurality of performance metrics. The performance metrics are associated with the operation of the entity and a plurality of time periods. Peer operational data is obtained for a plurality of peers of the entity for which it is known whether or not the event has occurred for each of the peers. The peer operational data comprises measurements of peer performance metrics. A genetic algorithm is employed to analyze the operational data and the peer operational data. A plurality of clauses are generated, and these clauses are used to characterize the operational data. Each of the clauses comprises a plurality of alleles, and the alleles comprise a count of time periods, at least one performance metric, a comparison operator, a threshold value, and a positive fraction. The plurality of clauses are evaluated as being either "true" or "false". A "true" evaluation being obtained if for any given number of time periods equal to the count of time periods, at least a fraction of the time periods equal to the positive fraction contain a performance metric which satisfies the comparison operator with respect to the threshold value. A "false" evaluation is obtained otherwise. A fitness function is applied to identify a fitness value for each of the clauses. The fitness value is determined by the degree to which each of the clauses evaluates as "true" when applied to the entity for which it is known the event has occurred, and evaluates as "false" when applied to the peers for which it is known the event has not occurred. The next step selects a plurality of clauses having a greater fitness value than other clauses, and those clauses having a greater fitness value are formed into a selected clauses group. A perturbation is applied to the alleles of the selected clauses to create additional clauses, and these additional clauses are added to the selected clauses group. A repetition of, at least one of, the applying a fitness function step, selecting a plurality of clauses step and applying a perturbation step is performed until a predetermined fitness value is reached for the selected clauses. The selected clauses are then applied to the operational data from the entity to determine whether the operational data indicates a past, present or future event.

BRIEF DESCRIPTION OF THE DRAWINGS

FIG. 1 is an exceptional anomaly score cutoff table.

FIG. 11 illustrates a heatmap comprised of a plurality of rows and columns. The columns of the heatmap represent time periods and the rows represent metrics of interest, such as vibration and performance measures.

FIG. 12 illustrates another heatmap that provides a snapshot of an example machine over a 24-hour period.

FIG. 16 illustrates a table which shows by column the units and by row the flags used to indicate which pattern(s) successfully match the desired results.

FIG. 17 illustrates classification rates for positive and negative cases referred to as "failure" and "peer" respectively.

DETAILED DESCRIPTION OF THE INVENTION

Figure 2:
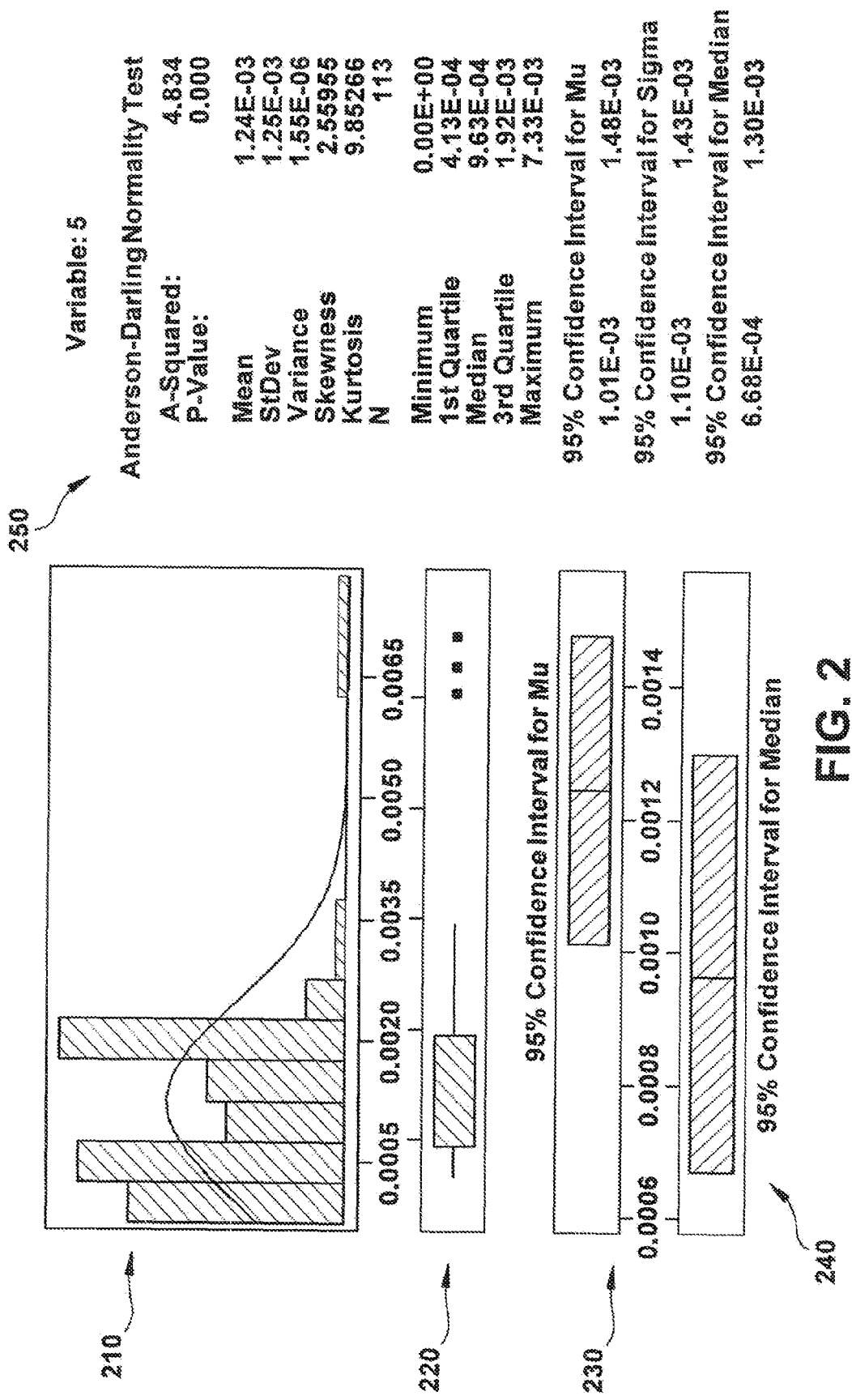
FIG. 2 illustrates the exceptional anomaly score descriptive statistics.

In monitoring and diagnostics (M&D), eliminating noise from data is a key concept. It becomes non-trivial when there are a lot of variables that need to be monitored simultaneously per second and even more so when condition adjustment (e.g., temperature, operating mode, pressure, etc.) is required. An anomaly detection and aggregation process and heatmap tool is herein described that is highly useful and revolutionary for monitoring and diagnostics. The process, method and tool, as embodied by the present invention, is particularly useful when applied to power generation equipment, such as, compressors, generators and turbines. However, the process, method and tool can be applied to any machine or system that needs to be monitored. For example, other machines that can be used with the present invention are gas turbines, hydroelectric turbines, steam turbines, bio-fueled turbines, wind turbines, engines, gensets, and locomotives. The term "turbomachine" will be understood to include all the previously mentioned turbomachines as well as the various components, subsystems and devices used in conjunction with the operation and maintenance of the turbomachines. The system can comprise at least some of the following features:

(1) Calculating exceptional anomaly scores (EAS) for engineering data, (e.g., operational sensor data). Exceptional anomaly scores quantify outlying data when compared to small sets of related data. EAS outperforms Z-score and control chart statistics in identifying anomalous observations.

(2) Creating multiple sensitivity settings for the exceptional anomaly scores so that users can define which percentage of the data they can effectively and efficiently monitor across a given set of tags and time points. Moreover, these different sensitivity settings can be used to add diagnostics, (e.g., alert creation).

(3) Providing methodologies for aggregating various anomalous observations at different data granularities, (e.g., hourly vs. daily anomalous observations). These different anomalous observations can be interlinked and transferable to one another. An anomalous hourly observation may propagate up to a daily anomalous observation.

(4) Creating alerts. These alerts are rule-based triggers that may be defined by the end-user or provided based on analytical means to identify events (e.g., compressor events) with lead-time. Alerts are based on exceptional anomaly scores and raw sensor data. Alerts may also make use of sensitivity setting adjustments and aggregation properties of exceptional anomaly scores.

(5) Creating heatmaps that turn data into knowledge. A heatmap is an outlier-detection-visualization tool that can be performed on each specified machine unit for a large number of selected tags across many different time points. A heatmap illustrates the anomaly-intensity and the direction of a 'target observation.' A heatmap may also contain a visual illustration of alerts, and directs immediate attention to hot-spot sensor values for a given machine. Heatmaps can also provide comparison to peers analysis, which allows the operational team to identify leaders and lagers, as well as marketing opportunities on the fly with great accuracy across different time scales (e.g., per second, minute, hour, day, etc.).

(6) Using a genetic algorithm to search operational data and/or exceptional anomaly scores. Through multiple evolutions of the genetic algorithm, those inputs which provide the greatest ability to differentiate between fault and non-fault conditions are selected.

Calculating Exceptional Anomaly Scores

In order to account for unit/machine and environmental variations and determine whether or not a given value for a tag for a target unit is outside an expected range (i.e., anomalous), context information may be used to form a basis for the analysis of the target unit's tag data. This context information can be taken from two primary sources: the target unit's past performance, and the performance of the target unit's peers. By using such context information to quantify the typical amount of variation present within the group or within the unit's own performance, it is possible to systematically and rigorously compare current tag data to context data and accurately assess the level of anomalous data in the target unit's tag values.

As noted above, context information is used to properly evaluate the degree to which a given tag is anomalous. In order to have an effective evaluation, the context data must be properly selected. When selecting the appropriate context data over the time domain, it is generally desirable to look at the closest data available to the time period of interest. Since the time period of interest is usually the most recent data available, the appropriate scope of time to consider is a sequence of the most recent data available for the unit—for example, the data corresponding to the last two calendar weeks. This mitigates the influence of seasonal factors.

Proper context data to take into account the behavior of the group and overall environment is found by using an appropriate group of 'peer' units to the target unit. For example, a group of turbines with the same frame-size and within the same geographic region are selected to act as the appropriate peer group for the target turbine.

In addition to the context considerations stated above, context data also includes comparable operating conditions. For this implementation, and as one example only, comparable operating conditions can be defined to mean any time period in the past where the unit has the same OPMODE, DWATT and CTIM values within a window of 10. OPMODE can be defined as the operation mode (e.g., slow cranking, peak output, 50% output, etc.). DWATT can be a metric for power (e.g., megawatt output). CTIM can be defined as a temperature metric (e.g., inlet temperature). For example, if the target observation's value of OPMODE is equal to 1 and DWATT is equal to 95, only the historical periods where OPMODE=1 and DWATT was between 90 and 100 could be used. These comparable operating conditions are defined as part of the system configuration.

By establishing the appropriate context, both in time, geography, frame size, and operating conditions, the need for a subjective assessment as to whether a given tag is anomalously high or low can be avoided, and objective and automatic calculations can be made to detect and quantify anomalies. To calculate the Z-Within (comparison to past) exceptional anomaly scores, we can use 10-15 historical observations where the unit was operating under comparable conditions (as defined above). These historical observations can be used to calculate an average and standard deviation. The z-score can then be calculated of the target observation using the historical observations' average and standard deviation. The minimum and maximum number of observations used for the calculation of Z-Within exceptional anomaly score is defined as part of the system configuration. Z-Within provides a comparison of a specific machine's current operating condition to the machine's prior operating condition. The equation used to calculate Z-Within may be generally of the form:

$$Z-Within_{exceptional} = \left(\frac{Value_{Target} - Average_{Historical}}{StandardDeviation_{Historical}}\right) \quad \text{(Equation 1)}$$

For each unit, up to 8 or more other units with the same frame-size with similar configurations and in the same geographic region can be identified as peers. The Z-Between exceptional anomaly score is an indication of how different a specific unit or machine is from its peers. For example, an F-frame gas turbine compared to other similar F-frame gas turbines. To calculate the Z-Between exceptional anomaly scores (comparison to peers), one can select the single most-recent observation from each of the peers where the peer is operating under comparable condition (as defined above). This results in up to 8 or more peer observations with which to calculate an average and standard deviation. The z-score of the target unit using the peer group's average and standard deviation can then be calculated. The minimum and maximum number of observations used for the calculation of Z-Between exceptional anomaly score is defined as part of the system configuration. The equation used to calculate Z-Between may be generally of the form:

$$Z-Between_{exceptional} = \left(\frac{Value_{Target} - Average_{Peers}}{StandardDeviation_{Peers}}\right) \quad \text{(Equation 2)}$$

Note that it is the case that a value can be either anomalously high, or anomalously low. While there generally is a particular direction that is recognized as being the preferable trend in a value (e.g., it is generally better to have low vibrations than high vibrations), it should be noted that this technique is designed to identify and quantify anomalies regardless of their polarity. In this implementation, the direction does not indicate the "goodness" or "badness" of the value. Instead, it represents the direction of the anomaly. If the exceptional anomaly score is a high negative number compared to the past, it means the value is unusually low compared to the unit's past. If the exceptional anomaly score is a high positive number, it means the value is unusually high compared to the unit's past. The interpretation is similar for peer anomaly scores. The anomaly direction of the individual tags can be defined as part of the system configuration.

By using these techniques to detect anomalies, alerts can be created. An alert can be a rule-based combination of tag values against customizable thresholds.

Creating Multiple Sensitivity Settings

For exceptional anomaly scores, a conversion between the scores and the percent tail calculations can be performed. Specifically, a range of magnitudes of exceptional anomaly scores will correspond to a range of percentages of the anomaly distribution given the distribution of the raw metric. Via this conversion, an analyst can pick the exceptional anomaly score cut off values that indicate 'alarms' or 'red flags' for the raw metrics. In addition, it provides an ease of use for the end-user who can freely decide what percentage is high enough to be named as an 'anomaly.' Moreover, via this conversion the 'anomaly' definition can be easily changed from application to application, business to business or metric to metric as needed.

FIG. 1 (Exceptional Anomaly Score Cutoff Table) is a conversion table that may be used when the raw metric is normally distributed and the anomaly definition is two-tailed (i.e., both high and low magnitudes of the raw metric would have anomalous ranges that the end-user cares about). For example, when the sample size is 8 (row 110) and the raw metric is assumed to be normally distributed, 0.15% (cell 130) of the cases are expected to fall below an exceptional anomaly score of −6 and above 6 (column 120). In other words, if the M&D team is willing to investigate the top 0.15% observations as 'out of norm' within a metric, then they should pick 6 as the score cut off given that their sample size is 8 and normality is assumed. This table also illustrates the relationship between the z-scores and exceptional anomaly scores. As the sample size increases and when normality is assumed, z-scores and exceptional anomaly scores become almost identical.

For example, in a turbine or compressor the sensor data may comprise over 300 different tags with many different shapes of distributions. A sensitivity analysis is needed to see whether the same cut off values can be used across tags or whether different cut off values are needed for different tags. In other words, how robust the conversion tables are across different distributions needs to be tested given the high dimensional sensor data. Although different tags may exhibit different shapes and scales of distributions, the Z-Within and Z-Between scores on those tags may have less variety in shape and by design in scale. Across all the Z-Within and Z-Between distributions, there have been detected natural cutoffs at exceptional anomaly scores of 2, 6, 17, 50 and 150. However, an additional systematic empirical study to determine the cut offs and the corresponding anomaly distribution percentages needs to be conducted.

The exceptional anomaly scores are categorized into 11 buckets (i.e., (−2, 2)=bucket0, (2, 6)=bucket1, (6, 17)=bucket2, (17, 50)=bucket3, (50, 150)=bucket4, (150 and up)=bucket5, (−6, −2)=bucket−1, (−17, −6)=bucket−2, (−50, −17)=bucket−3, (−150, −50)=bucket−4, (−150 and below) =bucket−5). The percent of Z-Within scores falling into each bucket for every tag are calculated. Then, the distribution is drawn of those percentages across tags for each bucket and the quartiles are calculated as well as the 95% confidence interval for the median.

FIG. 2 illustrates the anomaly score descriptive statistics and is an example of these calculations on bucket5. Region 210 is a histogram and shows the distribution of the probability or percentage values. These are the probabilities of getting an anomaly score at or above 150 cut off for Z-Withins. Region 220 is a boxplot which again shows the distributions of the probability or percentage values for an anomaly score being at or above 150. 230 illustrates the 95% confidence interval for the distribution mean of the probability or percentage values. The vertical line in the box represents the mean value and the limits of the box represent the minimum and the maximum values for the confidence interval. Another boxplot is indicated at 240 and this illustrates the 95% confidence interval for the distribution median of the probability or percentage values. The line in this box represents the median value and the limits of box represent the minimum and the maximum values for the confidence interval. The statistics listed in region 250 represent a normality test for the illustrated distribution, the basic statistics such as the mean and the median and the confidence intervals for the basic stats that are reported. The median for the bucket5 distribution is approximately 0.1%, indicating that approximately 0.1% of the Z-Within Scores are at or above 150 cutoff. 95% confidence interval for the median is 0.07%-1.3%.

Calculations are performed similar to the ones in FIG. 2 for all buckets separately, thus for all cut off values for Z-Withins and Z-Betweens. The results of the analysis indicate that similar cut offs across tags can be used for the given sensor data and thus the conversion tables as well as the preset cut offs are robust to raw tag distribution differences.

Figure 3:
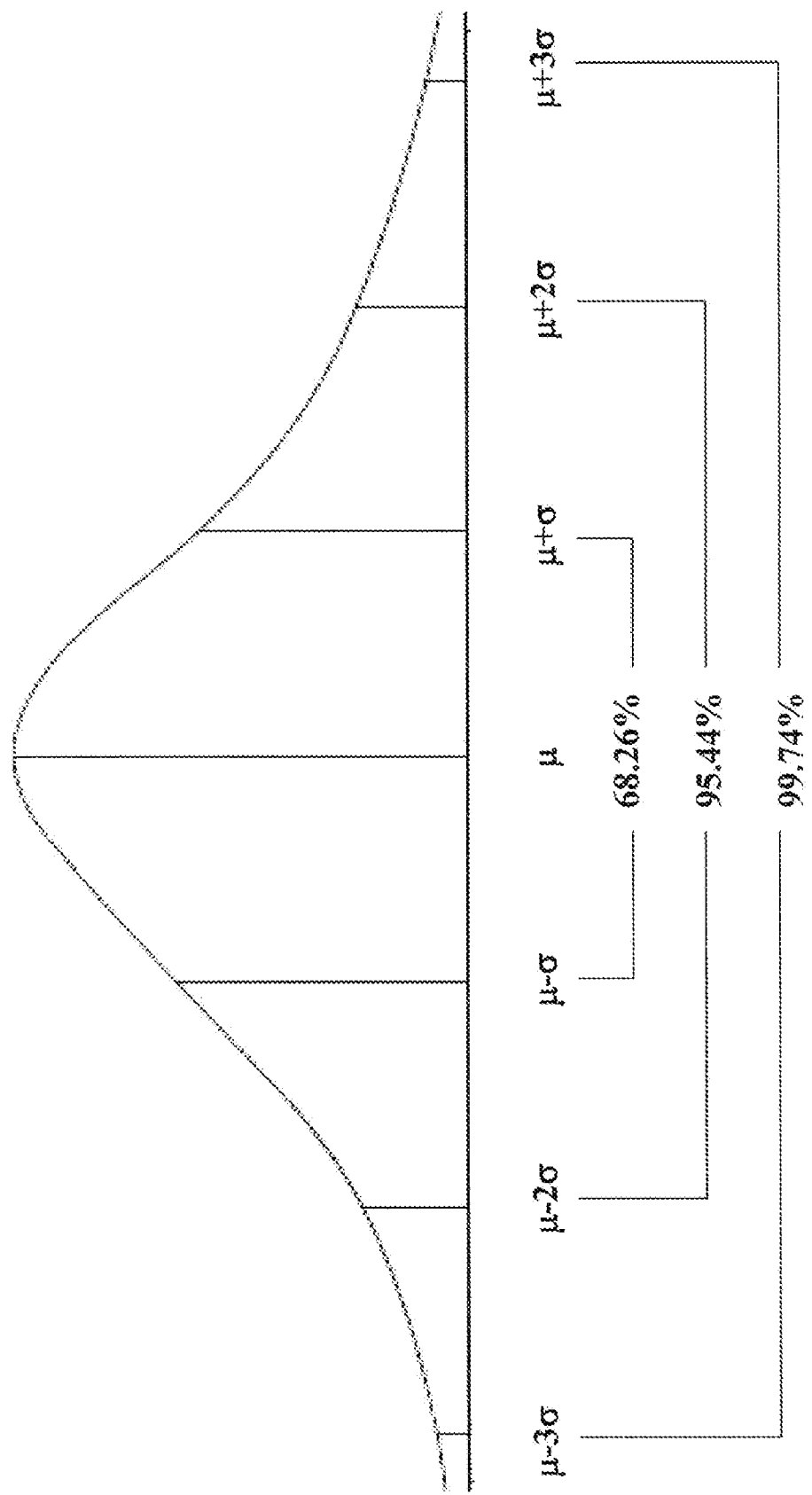
FIG. 3 is a graph illustrating the conversion between the cut off values and the anomaly distribution percentages based on the empirical results for the Z-Withins.

FIG. 3 shows the conversion between the cut off values and the anomaly distribution percentages based on the empirical results for the Z-Withins. Based on the empirical study approximately 6% of the anomaly scores are expected to have exceptional anomaly score values between 2 and 6. It should be noted that these expected anomaly percentages based on a real dataset are very similar to the percentages based on the simulation study displayed in FIG. 1. In specific, 6.7% of the scores are expected to be above the 2 cutoff and 13.4% of the scores are expected to be above the 2 and below the −2 cutoffs given this dataset. Similarly, when the sample sizes are 6 to 7, FIG. 1 shows 12.31% to 14.31% conversion for the above 2 and below −2 cutoffs.

The above results validate the expected conversions for the exceptional anomaly score cutoffs given real life data from power generation equipment sensor data. A second set of analysis was performed to validate that the suggested cutoff,s and corresponding percentages are valid not just for all Z-Withins across all tags but also within each tag where the sample size is relatively smaller compared to the overall data. Continuous Z-Within scores were converted into an 11-category ordinal score with the predefined 11 buckets. The distribution was then drawn of the ordinal score for each tag separately (see FIG. 4). As seen from the graph in FIG. 4, most of the tags have a similar shape distribution for the ordinal Z-Within Scores.

Figure 4:
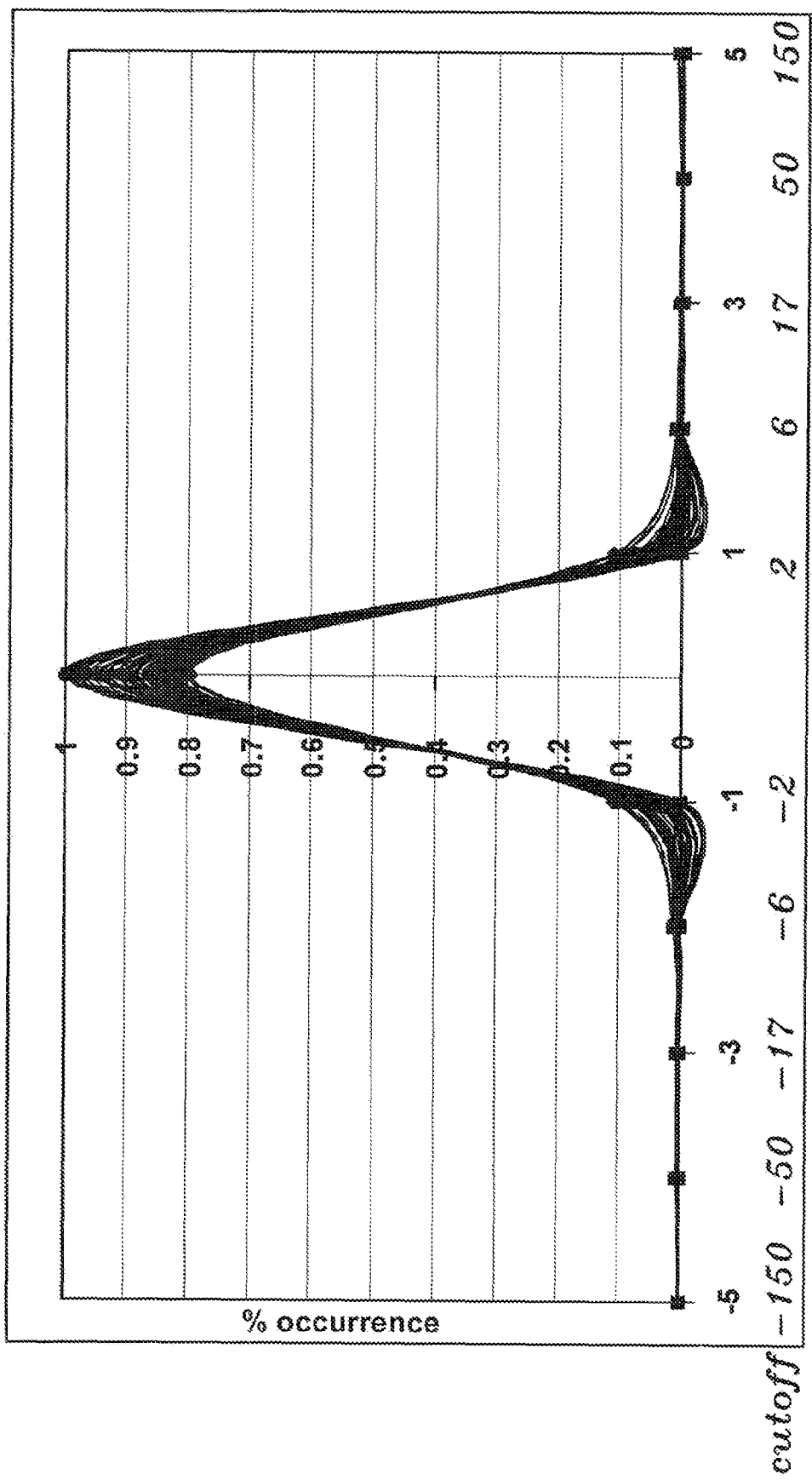
FIG. 4 illustrates the distribution of the Z-Within values.
Figure 5:
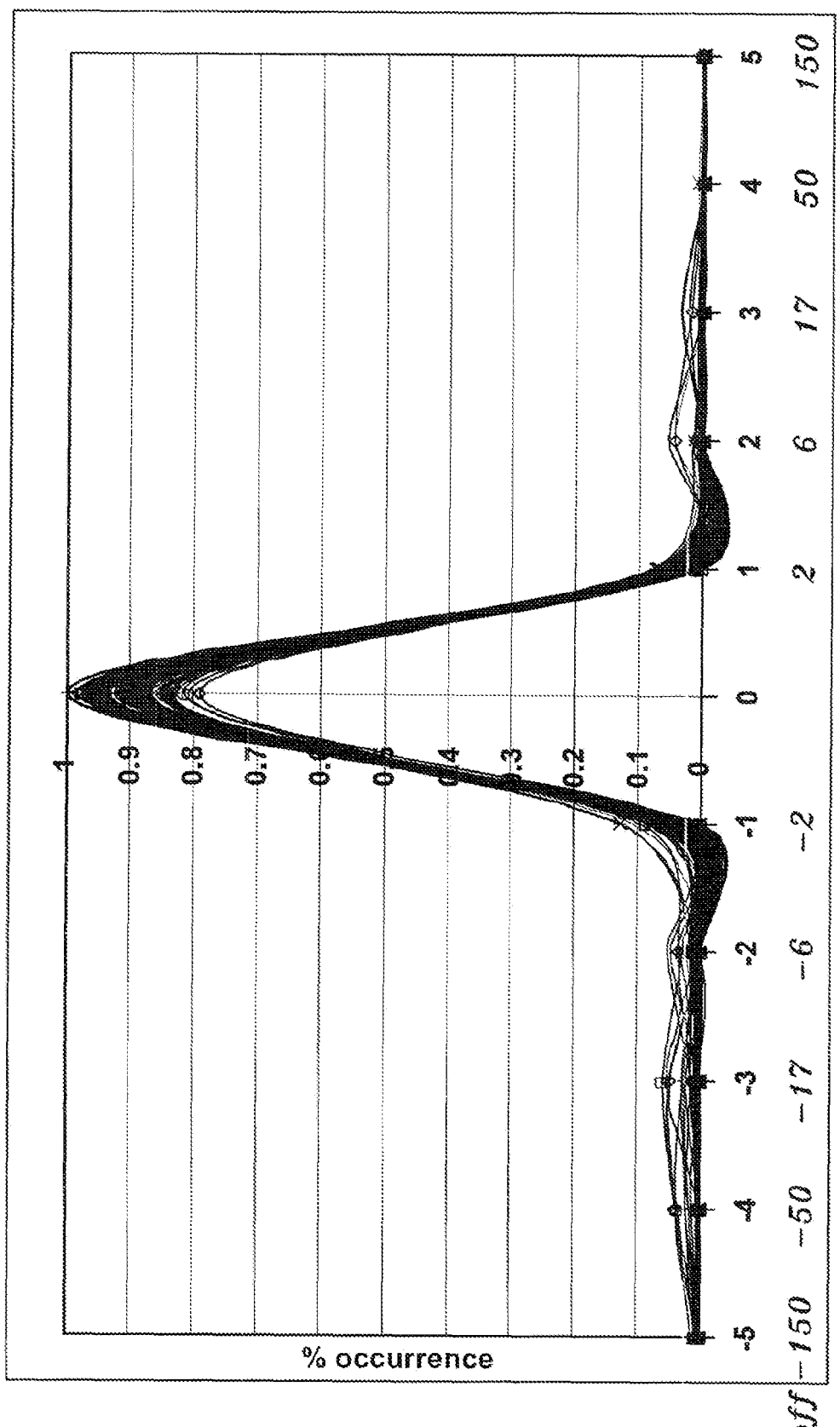
FIG. 5 illustrates the distribution of the Z-Between values.

FIG. 5 illustrates the distributions on the ordinal Z-Between scores for each tag similar to FIG. 4. Although there are some tags with slightly different shapes for buckets 2, 3, −2, or −3, in general the shapes for the Z-Between scores are not too different than the shapes for the Z-Within scores. Thus, it is concluded that the same cutoff values across tags can be used for both Z-Within and Z-Between scores within this dataset. Moreover, the conversion anomaly percentages for the suggested cutoffs (i.e., 2, 6, 17, 50, 150, −2, −6, −17, −50, −150) can be determined either based on the empirical results (see FIG. 3) or based on the simulation study (see FIG. 1) since they suggest similar numbers.

Aggregating Various Anomalous Observations

Many equipment users (e.g., power plants, turbine operators, etc.) have an abundance of data for monitoring and diagnostics. More importantly, this data often exists in small time units (e.g., every second or every minute). Although data abundance is an advantage, its aggregation should be done effectively so that data storage and data monitoring do not become problematic and data still keeps its useful knowledge.

Although aggregation is highly desirable, for some tasks it is not as advantageous as other steps. Anomaly aggregation in and of itself is an oxymoron. All anomalies imply specificity and concentrating on each and every data point, whereas aggregation implies summarization via excluding the specifics and the anomalies. However, regardless of its contradicting nature, anomaly aggregation is needed since per-second or per-hour data can not be stored for many tags across many time periods and more importantly, for certain types of events, it may be too much information to monitor every second or even every hour. More specifically, most equipment users are interested in catching 'acute' versus 'chronic' anomalies for their machine units. Acute anomalies are the rarely happening, high magnitude anomalies. Chronic anomalies frequently happen across different units and time for a specific metric.

Figure 6:
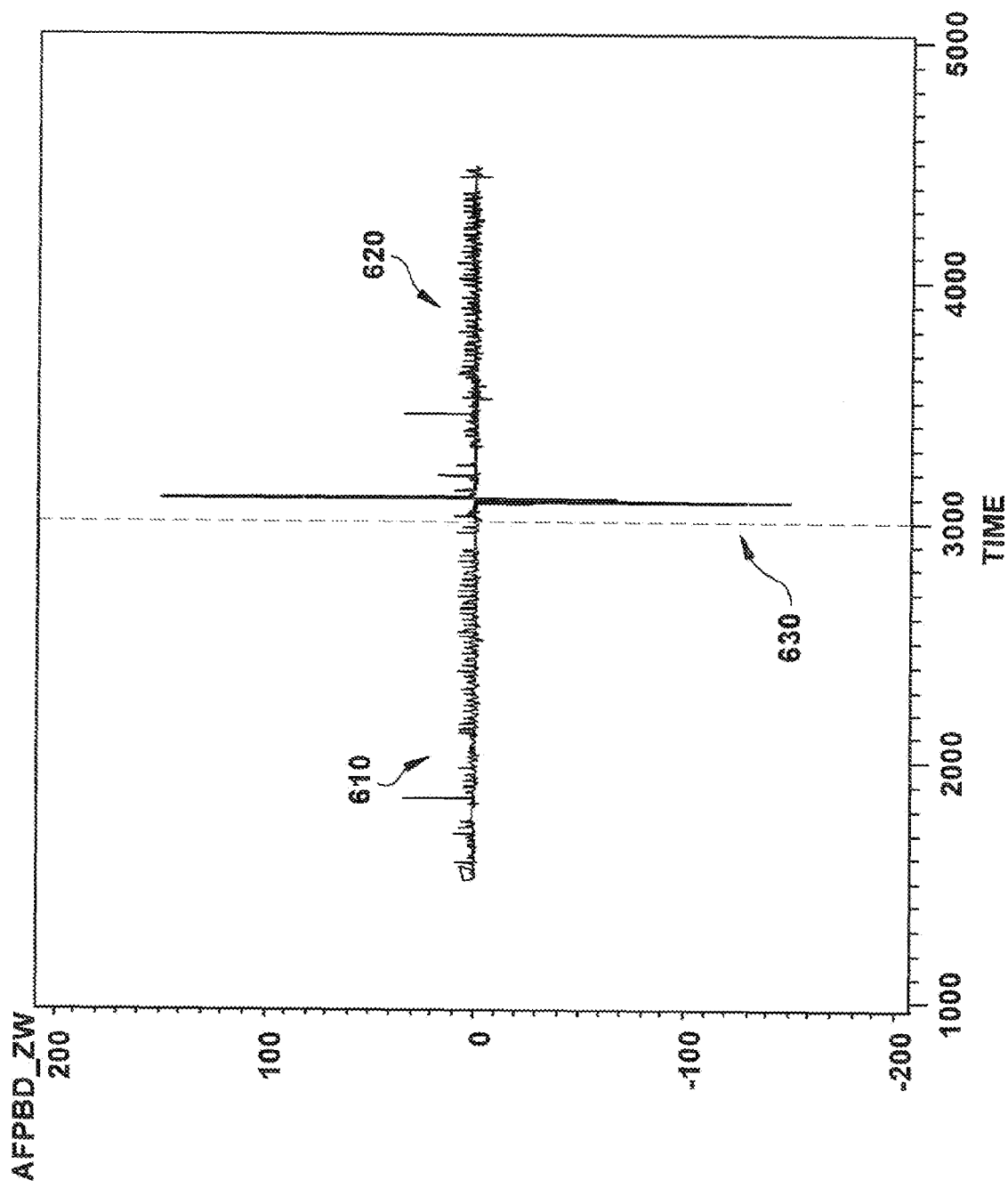
FIG. 6 illustrates the value of Z-Within over time for two separate machines.
Figure 7:
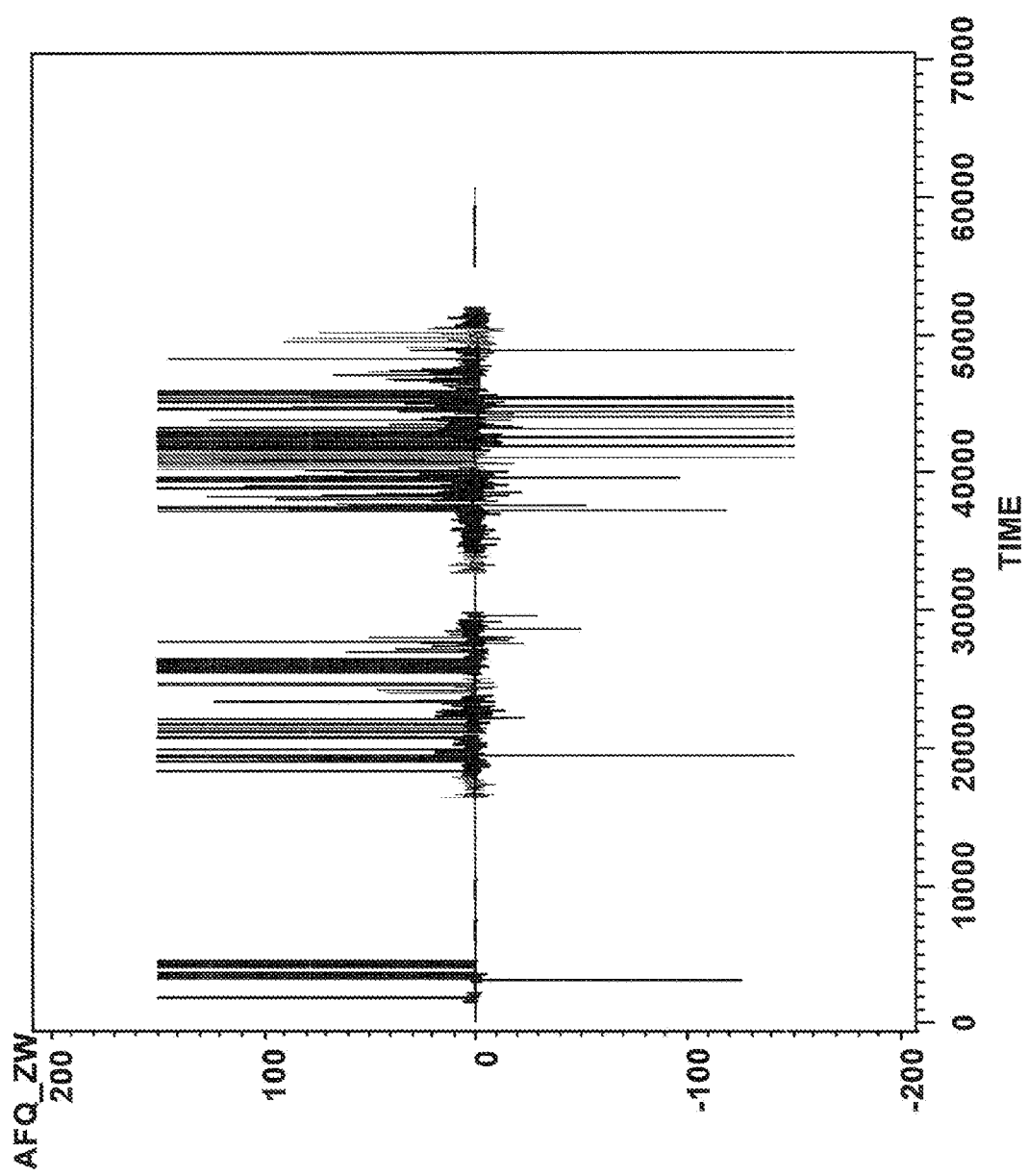
FIG. 7 illustrates the value of Z-Within over time for thirty-one separate machines.

FIG. 6 illustrates two units' Z-Within measurements over time. The X-axis is the time for each unit. The vertical dotted line 630 separates the two units' data. The first unit's data is on the left side of dotted line 630 and is indicated by 610. The second unit's data is to the right of the dotted line 630 and is indicated by 620. As can be seen from the graph, the second unit (region 620) has two outliers that are below and above −100 and 100, respectively. Since the occurrence of these ranges is a rare happening for this metric and for these units, these two outliers are named as 'acute'. The graph in FIG. 7, can be read similarly to the graph in FIG. 6, and demonstrates the concept of 'chronic anomalies'. Chronic anomalies, which by definition are capture anomalies (i.e., above 2 or below −2 magnitudes on exceptional anomaly scores) that frequently happen across different units and time for a specific metric.

As mentioned before, there are many different ways to aggregate data. Statistics by definition contains aggregation. Demonstrating the data via a handful of numbers, e.g., mean, median, standard deviation, variance, etc., is the simplistic definition of 'statistics' or 'analytics'. However, none of these long-existing methods provide a solution for anomaly aggregation. A daily average cannot consistently illustrate an hourly anomaly. Aggregation of "exceptional anomaly scores" is a new method, as embodied by the present invention. Previously, monitoring hourly data was the only way to identify hourly anomalies. Data monitoring had to be done at the level of granularity in which the anomalies needed to be detected. In other words, it had to be done in the highest granularities, e.g., per second or per hour. At this granularity it is difficult to see longer-term trends or to effectively compare and contrast across units.

Two measures are described, according to embodiments of the present invention, which can be used to aggregate the exceptional anomaly scores: magnitude anomaly measure and frequency anomaly measure. Magnitude anomaly measure uses central tendency measures such as the average. Frequency anomaly measure uses ratios or percentages.

A magnitude anomaly measure can identify acute anomalies, and may use central tendency measures, such as the average. A daily absolute average (shown on the left of FIG. 8) is one example of a magnitude anomaly measure. An absolute average can illustrate whether there are one or more high magnitude anomalies in either negative or positive direction within a predetermined period of time (e.g., second, minute, hour, day, week, month or year). For example, a daily absolute average would illustrate whether there are one or more high magnitude anomalies in either negative or positive direction within a day.

A frequency anomaly measure can be used to identify chronic anomalies, and may use ratios or percentages. A daily percent anomaly (shown on the right of FIG. 8) is an example of a frequency anomaly measure. Daily percent anomaly would complement the daily absolute average in the sense that it could illustrate the number of anomalous hours within a day, or the number of anomalous days within a month. In general, the frequency anomaly measure can be used to illustrate the number of anomalous time periods (e.g., seconds, minutes, hours, etc.) within a larger time period (e.g., minutes, hours, days, etc.).

When these two scores (i.e., daily absolute average and daily percent anomaly) are used simultaneously, they would demonstrate days with anomalous hours as well as differentiating acute vs. chronic anomalies. Acute anomalies (rarely occurring) would have high daily absolute averages and low daily percent anomalies. Acute anomalies could be illustrated by one or two high magnitude anomalies. On the other hand, chronic anomalies (frequently occurring) would have low or high daily absolute averages and high daily percent anomalies. Chronic anomalies could be illustrated by a few to a series of anomalies within a day. However, chronic anomalies do not necessarily need to have high magnitudes of exceptional anomaly scores.

Figure 8:
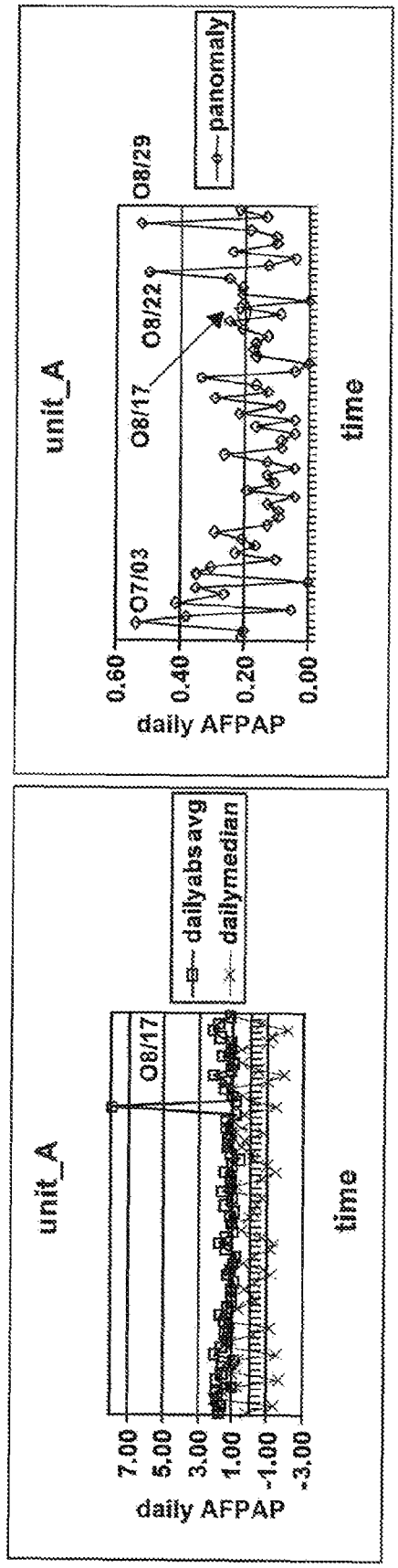
FIG. 8 illustrates the values of the daily absolute average and percent anomaly values over time.

FIG. 8 shows an example on the use of the magnitude and frequency anomaly measures. The graph on the left of FIG. 8 shows a magnitude anomaly measure with a daily absolute average. The graph to the right shows a frequency anomaly measure with a percent anomaly. These magnitude and frequency anomaly scores can be calculated both for Z-Betweens and Z-Withins. Moreover, on each dimension both magnitude and frequency scores can be separately ranked across tags, time periods, and machine units. Then those ranks can turn into percentiles, providing a percentile on magnitude anomaly score vs. a percentile on the frequency anomaly score. In addition, these percentiles on each score can be combined via the 'maximum' function for Z-Betweens and Z-Withins separately. More specifically, a maximum percentile on either a Z-Between or Z-Within Anomaly Score would represent either an acute or a chronic anomaly or both.

Figures 9, 10:
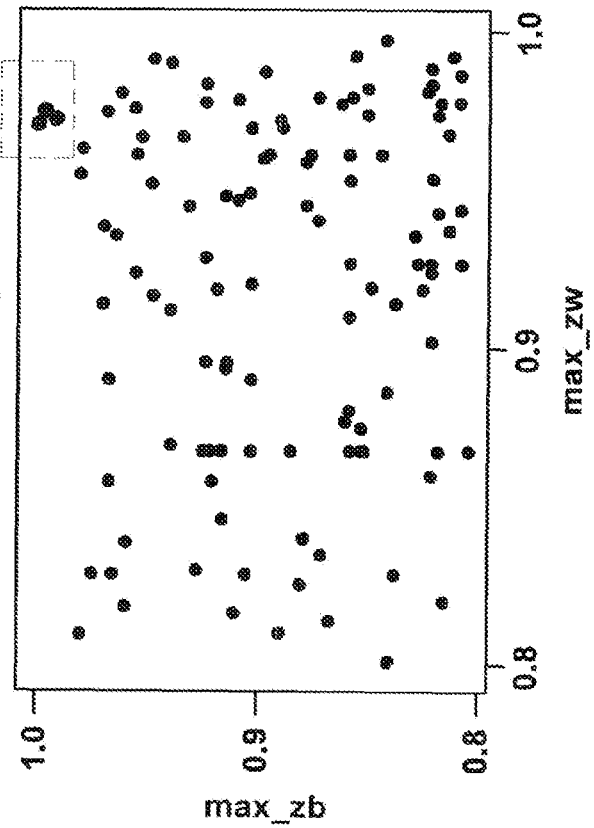
FIG. 9 illustrates a graph of a set of data of maximum percentile Z-Betweens and maximum percentile Z-Withins.
FIG. 10 illustrates a table of the daily magnitude and frequency anomaly scores and daily percentiles for Z-Betweens and Z-Withins.

FIG. 9 illustrates a graph and a set of data on maximum percentile Z-Betweens and maximum percentile Z-Withins. For example, the dots in the dotted box at the upper right of the graph represent the same turbine on four consecutive days triggering anomalies with respect to the "CSGV" tag. The CSGV tag can be a metric relating to the IGV (inlet guide vane) angle. These four data points (corresponding to data entries 92, 93, 94, 95 in FIG. 10) are anomalous both with respect to the past and peers of the unit. If these four days are further investigated for this unit on the CSGV tag, it can be seen that many hours within those days have anomalies with respect to peers. On the other hand, hourly Z-Within anomalies are rare in number compared to hourly Z-Between anomalies, however they are high in magnitude. All of this conclusion can be read from the data table in FIG. 10 that contains the daily magnitude and frequency anomaly scores and daily percentiles for Z-Betweens and Z-Withins.

Creating Alerts and Creating Heatmaps

The anomaly detection process and heatmap tool can be implemented in software with two Java programs called the Calculation Engine and the Visualization Tool, according to one embodiment of the present invention. The Calculation Engine calculates exceptional anomaly scores, aggregates anomaly scores, updates an Oracle database, and sends alerts when rules are triggered. The Calculation Engine can be called periodically from a command-line batch process that runs every hour. The Visualization Tool displays anomaly scores in a heatmap (see FIG. 11) on request and allows users to create rules. The Visualization Tool could be run as a web application. These programs can be run on a Linux, Windows or other operating system based application processor.

An example command line call for the Calculation Engine is:

java -Xmx2700m -jar populate.jar—update t7 n

This instructs the Calculation Engine to perform the periodic update, utilize up to 7 or more simultaneous threads, and identify any new sensor data in the database prior to proceeding. The program begins by calculating rules for any new custom alerts and any new custom peers of machine units created by the users of the Visualization Tool. It then retrieves newly arrived raw sensor data from a server, stores the new data in the Oracle database, and calculates exceptional anomaly scores and custom alerts for the newly added data. It stores results of all these calculations in a database, enabling the Visualization Tool to display a heatmap of the exceptional anomaly scores and custom alerts. If the calculations trigger a custom alert with a mile that has a high possibility of detecting a machine deterioration event with lead time, the Calculation Engine can be configured to send warning signals to members of the Monitoring and Diagnostics team. Alerts could be audio and/or visual signals displayed by the team's computers/notebooks, or signals transmitted to the team's communications devices (e.g., mobile phones, pagers, PDA's, etc).

The Visualization Tool's primary use is to display heatmaps for specific machine units to members of the Monitoring and Diagnostics team. Users of the Visualization Tool can change the date range, change the peer (group, and drill into time series graphs of individual tags' data. The Visualization Tool may utilize Java Server Pages for its presentation layer and user interface. The Java Server Pages are the views in MVC architecture and contain no business logic. The only requirements on the server and client machines are a Java compliant servlet container and a web browser, for this example embodiment.

The Visualization Tool also supports several other use cases. Users of the Visualization Tool can view peer heatmaps; find machines with similar alerts; create custom peer groups; create custom alerts; and view several kinds of reports. Peer heatmaps merge each machine's heatmap into a single heatmap with adjacent columns showing peer machines' heatmap cells at the same instant in time instead of showing the machine's own heatmap cells at earlier and later times. Users can change the date; drill into time series graphs comparing peers' data for specific tags, and drill through to machine heatmaps. On other pages, users can also specify custom alerts and search for machines that have triggered these alerts. Users can create, modify, and delete rules for custom alerts. Reports summarize information about monitored units, the latency of units' raw sensor data (which differs among units), and the accuracy of the alerts triggered so far.

For example, the anomaly detection techniques, as embodied by the present invention, were applied to a set of turbines for which a significant failure event occurred. The failure event was rare, occurring in only 10 turbines during the 4-month period for which historical sensor data was available. For each turbine that experienced the event (event units), up to 2 months of historical data was collected. For the purposes of comparison, 4 months of historical data for 200 turbines that did not experience the event (non-event units) was obtained.

A peer group was created for each event unit consisting of 6-8 other turbines of similar configuration operating within the same geographic region. The Z-Within and Z-Between exceptional anomaly scores were then calculated for the event and non-event units. The Z-Withins represented how different a unit was compared to past observations when the unit was operating under similar conditions as measured by operating mode, wattage output, and ambient temperature. The Z-Betweens represented how different a unit was compared to its peers when they were operating under similar conditions. These deviations were then visualized via a heatmap, as illustrated in FIG. 11.

The columns of the heatmap, shown in FIG. 11, represent time periods. The time periods could be days, hours, minutes, seconds or longer or shorter time periods. The rows represent metrics of interest, such as vibration and performance measures. For each metric, there can be two or more rows of colored cells, however, only one row is shown in FIG. 11 and the cells are shaded with various patterns for clarity. White cells can be considered normal or non-anomalous. The light vertical line filled cells in the AFPAP row could be considered as low negative values, while the heavy vertical line filled rows in the GRS_PWR_COR (corrected gross power) row could be considered as large negative values. The fight horizontal lines in the CSGV row could be considered as low positive values, while the heavy horizontal lines in the same row could be considered high positive values. The low alert row has a cross-hatched pattern in specific cells. This is but one example of visually distinguishing between low, high and normal values, and many various patterns, colors and/or color intensities could be used.

The cells of the heatmap can display different colors or different shading or patterns to differentiate between different levels or magnitudes and/or directions/polarities of data. In two-row embodiments, the top row could represent the magnitude of the Z-Between exceptional anomaly scores whereas the bottom row could represent the magnitude of the Z-Within exceptional anomaly scores. If the anomaly score is negative (representing a value that is unusually low), the cell could be colored blue. Smaller negative values could be light blue and larger negative values could be dark blue. If the anomaly score is positive (representing a value that is unusually high), the cell could be colored orange. Smaller positive values could be light orange and larger positive values could be dark orange. The user can specify the magnitude required to achieve certain color intensities. There can be as many color levels displayed as desired, for example, instead of three color levels, 1, 2 or 4 or more color intensity levels could be displayed. In this example the cutoffs were determined by the sensitivity analysis.

Figure 12:
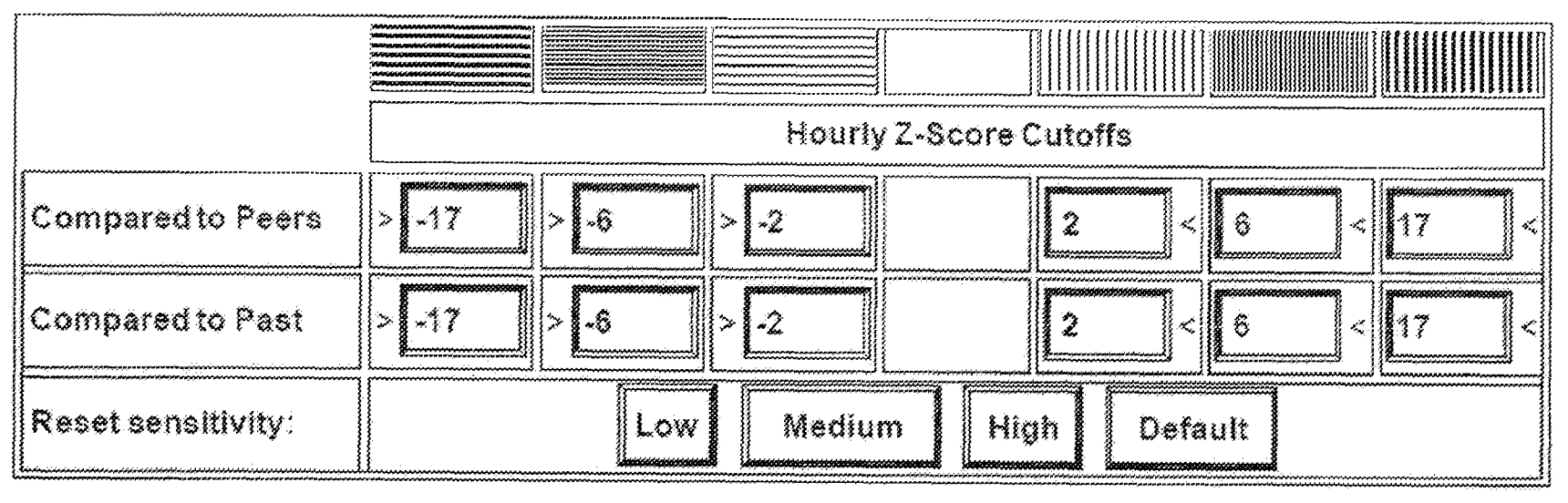

The heatmap shown in FIG. 12 provides a single snapshot of the entire system state for the last 24-hour period. The cells identify those metrics that are unusual when compared to the turbine's past or peers. The heatmap allows a member of the monitoring team to quickly view the system state and identify hot-spot sensor values. In the case of the failure event units, the heatmap shows that the turbine experienced a significant drop in many of the performance measures, such as GRS_PWR_COR (corrected gross power) at the same time it was experiencing significant increases in vibration (as measured by the BB and BR metrics). Inspection of event vs. non-event turbine heatmaps showed that this signature was present in 4 of the 10 event units for several hours prior to the event, but was not present in any of the non-event units. By visually inspecting the heatmap of event units versus non-event units, the monitoring team can develop rules that will act as warning signs of this failure condition. These rules can then be programmed into the system in the form of rule-based red flags. The system will then monitor turbines and signal or alert the monitoring team when these red flags are triggered.

The top row of the heatmap shown in FIG. 12 can display various patterns, colors and color intensities to visually distinguish between different ranges of values. In this example, large negative values can be indicated by heavy horizontal lines, medium negative values by medium horizontal lines and low negative values by light horizontal lines. Similarly, large positive values can be indicated by heavy vertical lines, medium positive values by medium vertical lines and low positive values by light vertical lines. In embodiments using color, the rectangles in the top row of the heatmap shown in FIG. 12 could display various colors and intensities. For example, the box filled with heavy horizontal lines could be replaced by a solid dark blue color, the box filled with medium horizontal lines could be replaced by a solid blue color, and the box filled with light horizontal lines could be replaced with a solid light blue color. The box filled with heavy vertical lines could be replaced by a solid dark orange color, the box filled with medium vertical lines could be replaced by a solid orange color, and the box filled with light vertical lines could be replaced with a solid light orange color. These are but a few examples of the many colors, patterns and intensities that can be used to distinguish between various anomalous values or scores.

Genetic Algorithm

A genetic algorithm (GA) can be used to derive patterns of a specific form to predict turbomachine failure or trip events, as well as other trip events and/or anomalous behavior in turbomachinery. The training set for a failure event (or other trip events) in a turbomachine is very small and unbalanced given the rarity of occurrence. The estimated probability is approximately less than one percent. As a result, sample sizes for training models are unavoidably small. There are a large number of operational metrics that can be utilized in discriminating positive and negative cases. This data is available or can be calculated from operational data. The genetic algorithm, according to aspects of the present invention, can efficiently navigate this highly non-linear search space and perform feature selection.

A genetic algorithm derives patterns by starting with a population of randomly generated patterns. The individual patterns are then evolved over many generations. In each generation, the fitness of every pattern in the population is evaluated based on a predetermined fitness function. There are several fitness functions available, all of which calculate fitness based on the number of true positives (correct alarms) vs. false positives (incorrect alarms) that result from the pattern. From one generation to the next, patterns are selected from the current population and modified. They may be modified by crossing with other patterns, or may be randomly mutated. Several patterns that appear to provide the best performance are retained from generation to generation. At the end of a generation, a new population is created which is made of the best of the old population as well as cross and mutated versions of those that were not retained. The new population is then used in the next iteration of the algorithm. The genetic algorithm terminates when the maximum (or desired) number of generations has been created and evaluated.

This genetic algorithm approach offers many benefits over the other approaches that have typically been employed. For instance, purely statistical methods have limitations in dealing with temporal data across many variables unless the data is pre-processed to create other intermediate factors such as slopes and moving averages. This information could be calculated on every piece of raw data, but one would quickly experience an explosion of data. Purely statistical methods also optimize their solutions at the observation level (e.g., each time period) instead of at the entity-level (e.g., individual machine). Therefore, statistical models are inadequate when using time series data for rare events since they do not emphasize the identification of a large number of positive units, but instead emphasize the identification of a large number of observations (which may all come from a single unit). The system and genetic algorithm, as embodied by aspects of the present invention, provide unique ways of integrating time-based data that would be difficult to represent in a logistic model.

This system is an entirely data-driven system that requires no physics-based model, no assumptions or estimations. The genetic algorithm can identify patterns that may have been unknown to monitoring personnel, and is designed to identify failure conditions that cannot be simulated reliably but happen in real life. Production or operational data of actual failure units is utilized to identify signatures that may indicate specific failure modes (e.g., trip events). For example, the genetic algorithm can be used to predict compressor combustion events, compressor trip events, turbine trip events and other trip/failure events. While there are performance models, performance alone cannot be used to accurately predict these types of events since performance degradation alone is not enough to discriminate these events vs. other reasons for performance degradation.

The representation of alleles (i.e., variations of a genetic characteristic) can be as deviations over time. For example, the alleles in the genetic algorithm can take the form of:

<tag> <greater than or less than> <value> for <n> out of <m> time periods

The term "tag" can be any of various sensor readings (e.g., vibration tags, efficiency tags, temperature tags, pressure tags, etc.), or "tag" could be an exceptional anomaly score. The "greater than" or "less than" are mathematical expressions and the genetic algorithm can include other mathematical expressions as well (e.g., <, >, =, $\leq$, $\geq$, etc.). The term "value" can be numerical or alphanumerical. The terms "n" and "m" represent numerical values of specific time periods, such as seconds, minutes, hours, days, months, years, etc. This allows the genetic algorithm to make use of values, their changes over time, and how the changes in one value over time interact with the changes in another value over time. This essentially allows the model to vary over time and to consider changes over time as part of the classification solution. In other embodiments the alleles could be of the form <tag> <greater than or equal to or less than or equal to> <value> for <n> out of <m> time periods.

The inputs and consideration of operating conditions are also very important. while the genetic algorithm can accept raw inputs, greater power can be achieved by utilizing Exceptional Anomaly Scores calculated using a bucketized correction model (i.e., only comparing an observation to times in its past when the unit was operating under similar conditions). These scores are standardized measures. The bucketized correction model eliminates much of the noise in the operational data.

Sensors are commonly used to measure inputs required for the physics-based model. In one embodiment of the present invention, the system provides the genetic algorithm with a set of exceptional anomaly scores for the sensors, and the genetic algorithm, through experimentation, picks those which provide the greatest ability to differentiate between fault and non-fault conditions. This does not require a predefined knowledge of what is likely to be affected or what are likely to be leading indicators of a problem. This also allows the system to reduce the number of sensors that must be monitored in order to diagnose a specific problem. It also allows multiple complementary patterns to be generated, compensating for conditions where some sensor values are unavailable in some units.

Operating parameters are not necessarily part of the solution definition. Our solutions are not constrained by specific operating parameters. Instead, we collect for operating conditions prior to submission to the genetic algorithm. We can then define rules which can be applied across operating conditions. In some cases, we can create the rule to include operating condition constraints, but this is not required.

The system and genetic algorithm, as embodied by aspects of the present invention, can be used to predict faults without utilizing any performance estimations. This can be useful in situations where no such performance models exist, such as those cases where "performance" is not quantified or characterized as a model. It is also useful in cases where performance models exist (as defined in the traditional sense) but are not, by themselves., adequate to identify the failure mode.

Our first attempt at working with the data utilized an integer representation to build simple regular expressions to match patterns of flags. This instance of the problem was run against data from 17 metric-derived flags across the dataset.

The goal was to derive simple regular expressions that would be applied to the temporal data from the individual machines. The genome for this attempt was of length # of flags*desired length of pattern in temporal time periods. For a desired pattern length of 5 time periods and 17 flags, the genome was 5*17=85 integers long.

Each allele could take a value of −1, 1, 0 or *. A "−1" value indicated that the data for that time period was explicitly missing or incalculable. A value of "1", indicated that the flag "fired" for the given time period. A "zero" value indicated that the flag did not "fire" for that time period. Finally, a "*" indicated that it didn't matter what the value of the flag was for a given time period.

The genetic algorithm evolved, in each single genome, one pattern per metric. A sample individual pattern, applied to flag data, could be (−1 0 1 0 *). This representation meets some of our criteria but not all. It did provide us a starting point to give us a rough idea of whether or not simple patterns could be used to discriminate between trip indicating and non-trip indicating data. This representation, while relatively easy to understand, is hard to interpret. Also, the specific implementation did little to integrate across multiple metrics as each metric was primarily considered independently. While each (pattern, metric) pair contributed to the fitness of the overall genome, these patterns were difficult to consider in an integrated method. Even so, this representation was a necessary step in the evolution of our thinking and provided useful insights and even interesting results.

Figures 13, 14, 15:
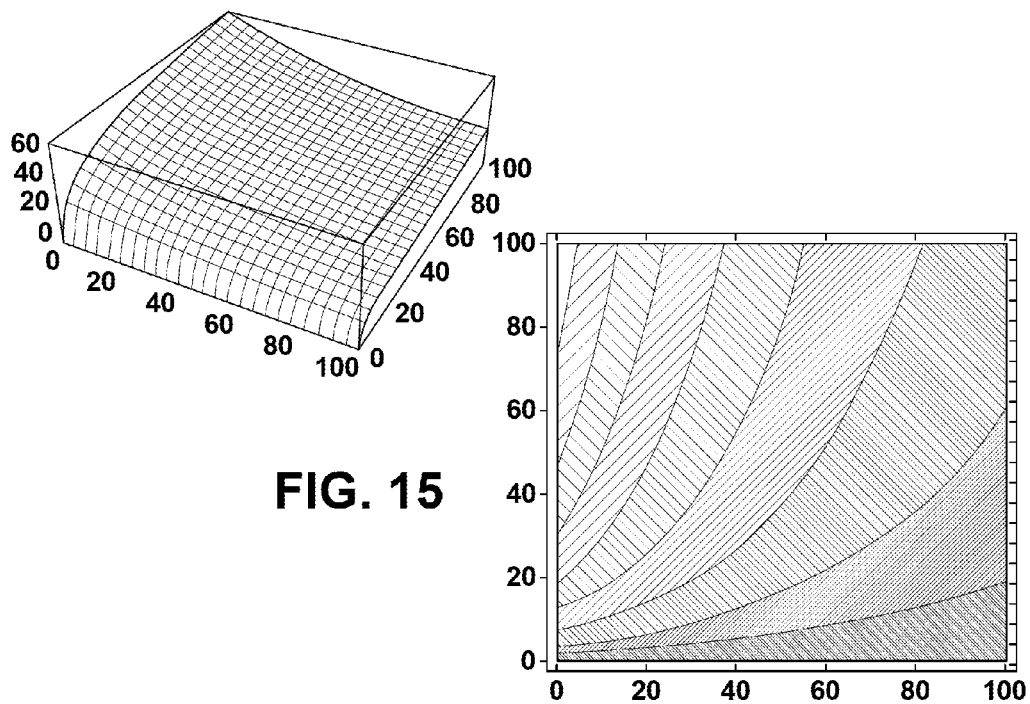
FIG. 13 illustrates a sample genome and corresponding English pattern of a genetic algorithm that can be applied to bucketed z-scores.
FIG. 14 illustrates how a match is determined for a pattern. The data shown in FIG. 14 can be compared against the pattern represented in FIG. 13.
FIG. 15 illustrates a graphical representation of the fitness function defined in Equation 4.

Our second representation utilized a different structure for defining patterns and more closely matched our ideals. These patterns seek to aggregate data across a number of time periods as well as across a number of metrics. These patterns are also easily expressed as English sentences. FIG. 13 provides an example of the English form of one of these patterns. These patterns are comprised of a number of clauses that fit the template of "n out of m time periods of metric i are operator than threshold". This number of clauses is decided before running the genetic algorithm.

Each clause contributes five alleles to the overall genome. The first two (n and m) are integers that are in the range 0 to q where q is the maximum number of time periods that a pattern may operate on. The third integer allele (i) identifies the metric that the pattern operates on. Thus, the value for that allele is in the integer range [1, I] where I is the number of metrics and each value in the range identifies a unique metric.

The fourth allele value (operator) determines a comparison operator to be used. This can be one of two values indicating "less than" or "greater than." This set of comparisons can be expanded to include "equal to" but it was determined that this allowed the genetic algorithm to develop patterns which were too explicit to be useful. However, in some applications the operator could be expanded to include other operators (e.g., <, >, =, ≦, ≧, and others).

The fifth and final allele (threshold) for a given clause indicates the threshold to be applied. When this method is applied to discretized z-scores, the value of this allele are in the range [min, max] where min is the minimal bucket value and max is the maximal bucket value. In one example run we utilized 67 buckets ranging from −33 to 33 inclusive. Again, the desired number of clauses determines the number of alleles in the genome. The final number of variables being determined by the genetic algorithm is five times the number of clauses.

FIG. 14 demonstrates how a match is determined for this type of pattern. The data shown in FIG. 14 is being compared against the pattern represented in FIG. 13. In this case the pattern matches at time $t_n$. The data represents temporal observations of each metric. The hashed boxes indicate missing data.

As is typical for pattern recognition and classification problems the goal of the fitness function is to reward patterns with significant precision and recall. A simplified version of this goal is to increase the ratio of positive matches (instances where the pattern matches a positive case) to negative matches (instances where the pattern matches a negative case). In both of our approaches the pattern represented by each genome was evaluated against each machine in our corpus. The resulting match or non-match was reported accordingly as a true positive, true negative, false positive, or false negative. This information was used to calculate the raw objective score for the genome in question.

The objective score for the flag-based genomes integrates the performance of each individual pattern (n) represented by the genome using a simple average. As shown in equation 3 each pattern in the genome contributes in a weighted fashion to the overall fitness of the genome.

$$\frac{1}{n}\sum_{i=0}^{n} weight(i)\frac{1 + posmatch(i)}{1 + negmatch(i)} \quad \text{(Equation 3)}$$

The weight for a specific pattern is based on the count of explicit factors in the pattern. Thus a pattern containing all 1's and 0's will have a greater weight than a pattern containing a portion of −1's or *'s. In equation 3, weight(i) indicates the weight of the $i^{th}$ pattern contained in the genome, where n is the total number of patterns in the genome being evaluated and posmatch(i) and negmatch(i) indicate the number of positive and negative cases matched by the ith pattern in the genome respectively.

Several iterations were made on the fitness score for this approach. Finally we settled on a fitness function that induced some non-linear factors into the relationship between true positives and false positives. We found that a linear relationship was insufficient to motivate the genetic algorithm to move to more valuable regions of the search space.

FIG. 15 displays the fitness surface relative to the percentage of possible true positives vs. the percentage of possible false positives matched by a particular pattern (genome). The surfaces displayed in FIG. 15 are generated from a fitness function as shown in Equation 4.

$$pospercent = 100\frac{tp}{to} \quad \text{(Equation 4)}$$
$$negpercent = 100\frac{fp}{fo}$$
$$fitness = 1000(pospercent + 1)^{\frac{1}{negpercent + 70}} - 1)$$

While the non-linear factors are somewhat expensive to compute, their value far outweighs this cost. Equation 4 shows the actual fitness calculations, according to one embodiment of the present invention. In Equation 4, tp and to indicate the number of true positives and the total number of positive cases respectively. Likewise fp and fo represent the number of false positives and the total number of false cases respectively.

The genetic algorithms employed operate as described above. As already shown, the representations are arrays of integers with constraints applied to specific allele positions. This approach utilized a genetic algorithm with a population size of 500 individuals and typically ran for 100 generations. Single-point crossover with a P(crossover) of 0.5 was utilized effectively within the confines of the genetic algorithm with a tournament selection method. This genetic algorithm also utilized a P(mutation) of 0.1. Given the rapid convergence rates we encountered with this approach, little time was spent in tuning this genetic algorithm.

We spent a significant amount of time tuning this approach as we moved to the larger datasets. Operational runs continued to experience fine-tuning of the run parameters. Our most consistent results emerged from an elitist-steady-state genetic algorithm utilizing uniform crossover and tournament selection with a P(crossover) of 0.5 and a P(mutation) of 0.05.

Our approach showed promising results on the data employed. The genetic algorithm has been able to make distinctions in the data at each step in the process from the flag-based patterns to each instance of the "n-out-of-m" patterns. While the results are more meaningful in the case of the "n-out-of-m" patterns, it is still useful to note the progression of capabilities and data starting with the original approach. The 'flag-based' approach gives us insight into benefits that we may reap by adding more explicit time relationships into the "n-out-of-m" method of aggregating, or accumulating, observations. The approach, using Boolean flag data, may also find applicability outside this problem space.

The genetic algorithm demonstrated rapid convergence on the small dataset with significant results. It is important to note that the dataset was very small and neatly balanced. This approach could possibly scale to larger datasets with more variables and less variation between positive and negative cases. A sample output can be found in FIG. 16. This chart shows, by column, the units/machines and, by row, the flags. A mark, an 'x' or an '0,' indicates that the pattern shown to the right of the row successfully matched the metric(flag) shown at the left of the row for the unit indicated at the top of the column. The column labeled "TP:FP" indicates how many true positives and false positives were accrued for the pattern in that row.

Note that during evaluation those patterns which matched more negative cases than positive cases were inverted and then scored appropriately. The patterns that have been negated are displayed using '0' to mark negated matches while matches from patterns which have not been negated are marked using an 'x'.

In this approach, according to one aspect of the present invention, we maintained a randomly selected set of machines to hold out for testing the robustness of the patterns. This hold-out set represents no more than 30% of the total corpus. The table illustrated in FIG. 17 shows classification rates for positive and negative cases referred to as "Failure" and "Peer" respectively. These rates are also provided for each portion of the corpus. As shown in the table the classification rates for a single pattern indicate that we can correctly classify up to 44% of the in-sample positive cases while misclassifying only 3% of the in-sample false cases.

More significant results were deduced by combining patterns across multiple runs of the genetic algorithm. As the genetic algorithm was run the patterns produced were stored in a database and then post-processed to find combinations with significant increases in overall performance. This is also shown in the table of FIG. 17. The bottom row indicates the classification rates for combinations of patterns. This shows that a combination of the three chosen patterns results in correctly classifying 63% of the units while only misclassifying 5% of the negative cases overall.

Figure 18:
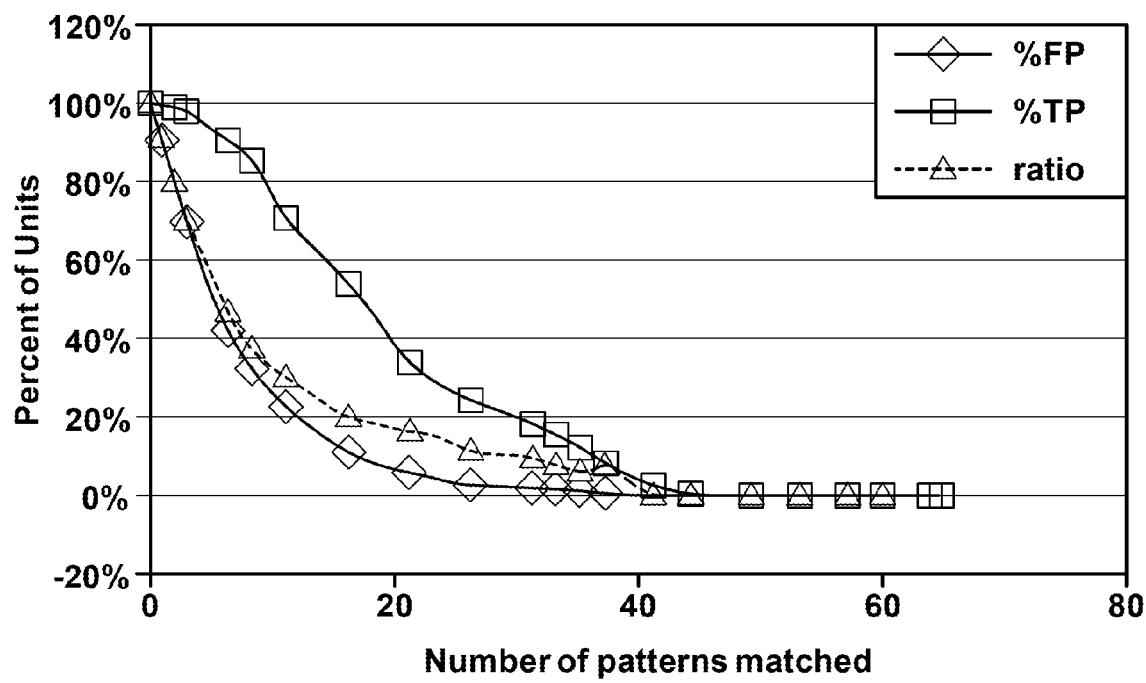
FIG. 18 illustrates a graph showing the discrimination of units based on the number of final patterns reached.

Another useful means of combining patterns from multiple runs of the genetic algorithm was via a histogram. FIG. 18 shows the discrimination of units based on the number of final patterns matched. To construct this chart the final patterns were recorded over approximately 65 runs of the genetic algorithm. A count of the number of matches was compiled for each unit in the corpus. The chart indicates that roughly 35% of positive cases (TP's) are matched by at least 20 of those 65 patterns while only 6% of negative units are matched by at least 20 patterns.

This approach can also be applied to various sets of data relating to other aspects of the power generation domain and has broader applicability for other domains as well. These techniques can yield important insights into fault detection or optimization of operational settings for power generation equipment. As is typical with genetic algorithms, the methods shown here help us develop a picture of the dominant solutions in the space. In actuality we are equally interested in the non-dominant solutions as well. We would like to apply a variety of niching, sharing, crowding and multi-objective techniques to this data to build a more complete perspective on the various "species" of failure or trip events.

It may also be beneficial to extend the representation to include other "operators" and time relationships. Aside from simple aggregation methods, the repertoire of methods could include concepts such as slope and variance. Current patterns assume that each feature is happening concurrently. These techniques may also be able to leverage explicit representation of time relationships such as "before" and "after" in addition to the current implied "during".

In another aspect of the present invention the method can be used for detecting or predicting the presence of an event in a body of time-series multivariate data. For example, the method could be used to detect fraudulent or misleading financial reporting in a body of financial data for a company based on multiple financial metrics as viewed over multiple time periods. The method can use data associated with a body of peers to the company to be analyzed, for which it is known when the reported data was fraudulent or misleading. These peers and their data are fed to a system that applies a genetic algorithm to evolve a set of characteristics that can be used to identify patterns that indicate the presence of misleading financials. The financial metrics can include both qualitative and quantitative data. The characteristics can then be applied to the data for the company of interest in order to determine whether or not misleading financial data is present.

A first step in such a method can include obtaining operational data for the entity. This operational data comprises measurements of a plurality of performance metrics. The performance metrics are associated with the operation of the entity and a plurality of time periods. Peer operational data is obtained for a plurality of peers of the entity for which it is known whether or not the event has occurred for each of the peers. The peer operational data comprises measurements of peer performance metrics. A genetic algorithm can be employed to analyze the operational data and the peer operational data.

A plurality of clauses are generated, and these clauses are used to characterize the operational data. Each of the clauses comprises a plurality of alleles, and the alleles comprise a count of time periods, at least one performance metric, a comparison operator, a threshold value, and a positive fraction. The plurality of clauses are evaluated as being either "true" or "false". A "true" evaluation being obtained if for any given number of time periods equal to the count of time periods, at least a fraction of the time periods equal to the positive fraction contain a performance metric that satisfies the comparison operator with respect to the threshold value. A "false" evaluation is obtained otherwise.

A fitness function is applied to identify a fitness value for each of the clauses. The fitness value is determined by the degree to which each of the clauses evaluates as "true" when applied to the entity for which it is known the event has occurred, and evaluates as "false" when applied to the peers for which it is known the event has not occurred. The next step selects a plurality of clauses having a greater fitness value than other clauses, and those clauses having a greater fitness value are formed into a selected clauses group. A perturbation is applied to the alleles of the selected clauses to create additional clauses, and these additional clauses are added to the selected clauses group.

A repetition of, at least one of, the applying a fitness function step, selecting a plurality of clauses step and applying a perturbation step is performed until a predetermined fitness value is reached for the selected clauses. The selected clauses are then applied to the operational data from the entity to determine whether the operational data indicates a past, present or future event. For example, if the entity is a business, the event could be financial fraud, or if the entity is a machine, the event could be a malfunction or failure event.

In another aspect of the present invention the method can be used for predicting or detecting an event in turbomachinery. The method includes the step of obtaining operational data from at least one machine. The operational data comprises a plurality of performance metrics associated with the machine's operation and a plurality of time periods. Another step obtains peer operational data from at least one peer machine. The peer operational data comprises a plurality of performance metrics associated with the operation of the peer machines. A determining step determines if the peer machines have experienced the event or not experienced the event.

A genetic algorithm (GA) can be employed to analyze the operational data and the peer operational data. The genetic algorithm generates a plurality of clauses, and the clauses are used to characterize the operational data. Each clause is comprised of a plurality of alleles, and the alleles are comprised of a count of time periods, at least one performance metric, a comparison operator, a threshold value, and a positive fraction. The next step evaluates the clauses as being either "true" or "false". A "true" evaluation is obtained if for any given number of time periods equal to the count of time periods, at least a fraction of the time periods equal to the positive fraction contain a performance metric that satisfies a comparison operator with respect to the threshold value. A "false" evaluation is obtained otherwise.

In the next step a fitness function is applied to identify a fitness value for each of the clauses. The fitness value is determined by the degree to which each of the clauses evaluates as "true" when applied to at least one peer machine for which it is known the event has occurred, and "false" when applied to at least one peer machine for which it is known said event has not occurred. The next step selects a plurality of clauses having a greater fitness value than other clauses, and those clauses having a greater fitness value form a selected clauses group. A perturbation is applied to the alleles of the selected clauses to create additional clauses and these additional clauses are added to the selected clauses group.

The steps of applying a fitness function, selecting a plurality of clauses, and applying a perturbation can be repeated until a predetermined fitness value is reached for the selected clauses. The selected clauses are then applied to the operational data from the machine to determine whether the operational data indicates a past, present or future event.

As described above, the genetic algorithm's technical effect is to identify patterns in temporal data, particularly multi-variate temporal data, for the purpose of detecting patterns that may be associated with particular results or events (e.g., failure or trip events). The structure of the chromosome selected for evolution by the genetic algorithm provides the ability of the system to identify patterns that may be relevant. This structure, as described above, can include the use of flag-based patterns, as well as the use of n-out-of-m type patterns within the temporal data being analyzed. This structure is also extensible to take into account the directional relationship of identified elements within the data. The language in which the chromosomes are described is extensible and able to integrate multiple temporal and inter-variable relationships beyond those described above. These techniques provide a foundation for multidimensional behavior analysis of data from a variety of domains including but not limited to: operational data, production data, manufacturing data, and historical data.

While various embodiments are described herein, it will be appreciated from the specification that various combinations of elements, variations or improvements therein may be made, and are within the scope of the invention.

What is claimed is:

1. A method for predicting or detecting an event in turbomachinery comprising:

obtaining operational data from at least one machine using at least one sensor, said at least one machine comprising a turbomachine, said turbomachine comprising at least one of, a compressor, an engine, a generator and a turbine, said operational data comprising a plurality of performance metrics associated with the operation of said at least one machine, said performance metrics being associated with a plurality of time periods;

obtaining peer operational data from at least one peer machine, said at least one peer machine comprising a turbomachine, said turbomachine comprising at least one of, a compressor, an engine, a generator and a turbine, said peer operational data comprising a plurality of performance metrics associated with the operation of said at least one peer machine;

determining if said at least one peer machine has experienced said event or has not experienced said event;

employing a genetic algorithm to analyze said operational data and said peer operational data, said genetic algorithm comprising;

generating a plurality of clauses, said clauses used to characterize said operational data, each of said clauses comprising a plurality of alleles, said alleles comprising a count of time periods, at least one performance metric, a comparison operator, a threshold value, and a positive fraction;

evaluating said plurality of clauses as being either "true" or "false", a "true"

evaluation being obtained if for any given number of time periods equal to said count of time periods, at least a fraction of said time periods equal to said positive fraction contain a performance metric which satisfies said comparison operator with respect to said threshold value, and a "false" evaluation obtained otherwise;

applying a fitness function to identify a fitness value for each of said clauses, said fitness value determined by the degree to which each of said clauses evaluates as "true" when applied to said at least one peer machine for which it is known said event has occurred, and which each of said clauses evaluates as "false" when applied to said at least one peer machine for which it is known said event has not occurred;

selecting a plurality of said clauses having a greater fitness value than other clauses, those clauses having a greater fitness value forming a selected clauses group;

applying a perturbation to said alleles of said selected clauses to create additional clauses and adding said additional clauses to said selected clauses group;

repeating, at least one of, said applying a fitness function step, selecting a plurality of said clauses step and applying a perturbation step until a predetermined fitness value is reached for said selected clauses;

applying said selected clauses to the operational data from said at least one machine to determine whether the operational data indicates a past, present or future event.

2. The method of claim 1, wherein the event comprises a failure event.

3. The method of claim 2, wherein said at least one machine and said at least one peer machine are chosen from the group comprising:

a gas turbine, a hydroelectric turbine, a steam turbine, a wind turbine, and a locomotive engine.

4. The method of claim 3, wherein the step of obtaining operational data and the step of obtaining peer operational data comprise monitoring the operation of said machines in real-time using a plurality of sensors.

5. The method of claim 1, wherein said performance metrics comprise operating parameters of said at least one machine and said at least one peer machine.

6. The method of claim 1, wherein said fitness value is determined by considering the time periods for which a pattern is detected and a pattern's nearness to the time periods in which the event occurred.

7. The method of claim 1, wherein said fitness value is based on the number of times that a pattern is detected for a peer machine that experienced the event vs. a peer machine that did not experience the event.

8. The method of claim 1, wherein said alleles are generally comprised of the form:

<tag> <greater than or less than> <value> for <n> out of <m> time periods;

wherein,

"tag", is an exceptional anomaly score or an operational metric;

"greater than or less than", is a choice between a "greater than"mathematical operator or "less than" mathematical operator;

"value", is a numerical or alphanumerical value.

"n" and "m", are numerical values representing a specific quantity of time periods.

9. The method of claim 1, wherein said alleles are generally comprised of the form:

<tag> <greater than or equal to or less than or equal to> <value>for <n> out of<m> time periods;

wherein,

"tag", is an exceptional anomaly score or an operational metric;

"greater than or equal to or less than or equal to", is a choice between a "greater than or equal to" mathematical statement or "less than or equal to"mathematical statement;

"value", is a numerical or alphanumerical value;

"n" and "in", are numerical values representing a specific quantity of time periods.

10. The method of claim 1, wherein said genetic algorithm utilizes a fitness function generally of the form:

$$pospercent = 100 \frac{tp}{to}$$
$$negpercent = 100 \frac{fp}{fo}$$
$$fitness = 1000(pospercent+1)^{\frac{1}{negpercent+70}} - 1).$$

wherein, tp and to indicate the number of true positives and the total number of positive cases respectively and fp and fo represent the number of false positives and the total number of false cases respectively.

11. A method of predicting or detecting the occurrence of an event for a turbomachine, using a genetic algorithm, comprising:

obtaining operational data for at least one machine using at least one sensor, said at least one machine comprising a turbomachine, said turbomachine comprising at least one of, a compressor, an engine, a generator and a turbine, the operational data comprising measurements of a plurality of performance metrics associated with the operation of said at least one machine each of said performance metrics being associated with at least one of a plurality of time periods;

obtaining peer operational data for at least one peer machine, said at least one peer machine comprising a turbomachine, said turbomachine comprising at least one of, a compressor, an engine, a generator and a turbine, the peer operational data comprising measurements of peer performance metrics;

employing a genetic algorithm to analyze said operational data and said peer operational data comprising;

generating a plurality of clauses, said clauses used to characterize said operational data, each of said clauses comprising a plurality of alleles, said alleles comprising a count of time periods, at least One performance metric, a comparison operator, a threshold value, and a positive fraction; evaluating said plurality of clauses as being either "true" or "false", a "true"evaluation being obtained if for any given number of time periods equal to said count of time periods, at least a fraction of said time periods equal to said positive fraction contain a performance metric which satisfies said comparison operator with respect to said threshold value, and a "false" evaluation being obtained otherwise;

applying a fitness function to identify a fitness value for each of said clauses, said fitness value determined by the degree to which each of said clauses evaluates as "true" when applied to said at least one peer machine for which it is known said event has occurred, and which each of said clauses evaluates as "false" when applied to said at least one peer machine for which it is known said event has not occurred;

selecting a plurality of said clauses having a greater fitness value than other clauses, those clauses having a greater fitness value forming a selected clauses group;

applying a perturbation to said alleles of said selected clauses to create additional clauses and adding said additional clauses to said selected clauses group;

repeating, at least one of, said applying a fitness function step, selecting a plurality of said clauses step and applying a perturbation step until a predetermined fitness value is reached for said selected clauses;

applying said selected clauses to the operational data from said at least one machine to determine whether the operational data indicates a past, present or future event.

12. The method of claim 11, wherein the event comprises a failure event and the turbomachine is chosen from the group comprising:

a gas turbine, a hydroelectric turbine, a steam turbine, a wind turbine, and a locomotive engine.

13. The method of claim 12, wherein the performance metrics and the peer performance metrics comprise operating parameters of said turbomachine and said at least one peer machine, respectively.

14. The method of claim 13, wherein the step of collecting operational data on the turbomachine comprises monitoring the operation of said turbomachine in real-time using a plurality of sensors.

15. The method of claim 13, wherein said fitness value is determined by considering the time periods for which a pattern is detected and said pattern's nearness to the time periods in which the event occurred.

16. The method of claim 13, wherein said fitness value is based on the number of times that a pattern is detected for a peer that experienced the event vs. a peer that did not experience the event.

* * * * *